United States Patent [19]
Hamaguchi et al.

[11] Patent Number: 6,104,865
[45] Date of Patent: Aug. 15, 2000

[54] VIDEO SIGNAL RECORDING AND/OR REPRODUCING APPARATUS FOR RECORDING AND/OR REPRODUCING A SIGNAL OBTAINED BY CONVERTING A NUMBER OF SCANNING LINES OF A VIDEO SIGNAL

[75] Inventors: Masakazu Hamaguchi, Ebina; Takashi Furuhata, Kamakura; Hiroaki Takahashi, Yokohama, all of Japan

[73] Assignee: Hitachi, Ltd., Tokyo, Japan

[21] Appl. No.: 07/881,753

[22] Filed: May 6, 1992

[30] Foreign Application Priority Data

May 10, 1991 [JP] Japan ..................................... 3-105538

[51] Int. Cl.⁷ .............................. H04N 5/92; H04N 5/921
[52] U.S. Cl. ............................................ 386/123; 386/131
[58] Field of Search ..................................... 358/330, 335, 358/310, 342, 140, 141, 11, 12; 360/9.1, 33.1, 55, 32; 368/46, 92, 109, 111, 112, 123, 124, 131, 27, 33, 37, 40, 1

[56] References Cited

U.S. PATENT DOCUMENTS

| | | | |
|---|---|---|---|
| 4,730,222 | 3/1988 | Schauffele | 358/310 |
| 4,866,519 | 9/1989 | Lucas et al. | 358/140 |
| 4,963,991 | 10/1990 | Honjo | 358/310 |
| 5,029,007 | 7/1991 | Spiero | 358/181 |
| 5,122,885 | 6/1992 | Yoshioka et al. | 358/310 |
| 5,132,793 | 7/1992 | Hirahata et al. | 358/140 |
| 5,191,417 | 3/1993 | Skinner et al. | 358/141 |
| 5,218,436 | 6/1993 | Sagiyama et al. | 358/141 |
| 5,353,065 | 10/1994 | Katsumata et al. | 348/556 |

FOREIGN PATENT DOCUMENTS 265581 3/1990 Japan.

OTHER PUBLICATIONS

ITEJ Technical Reporty vol. 14, No. 75 VIR 90 to 73 p. 7 to 13 Dec. 1990.

*Primary Examiner*—Robert Chevalier
*Attorney, Agent, or Firm*—Antonelli, Terry, Stout & Kraus, LLP

[57] ABSTRACT

A video signal recording and/or reproducing apparatus which is capable of recording and/or reproducing both high definition and standard television signals is disclosed. Accordingly, video signals of two systems such as the high definition and standard television signals can be recorded and/or reproduced by a single apparatus. The standard television signal is reproduced as a video signal having a high picture quality in a format similar to that of the high definition television signal. Even if the video signal to be recorded is the standard television signal, a reproduced picture having a higher picture quality than that of the standard television signal and having no distortion due to a difference in aspect ratios between the high definition and standard television signals can be provided.

19 Claims, 17 Drawing Sheets

FIG. 3
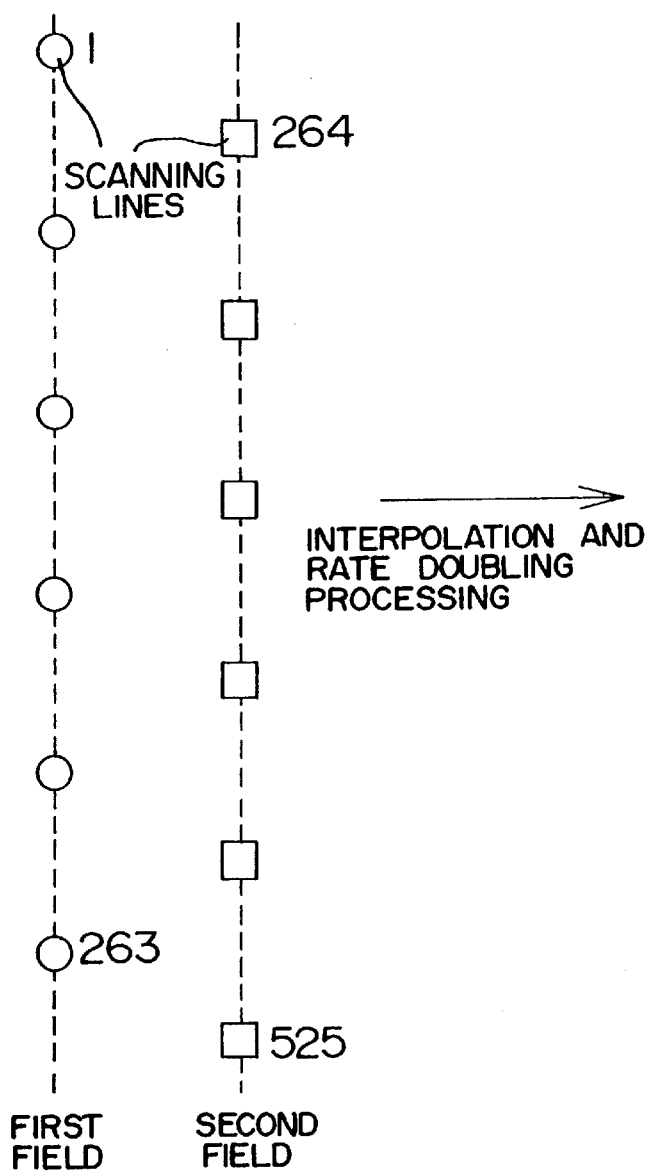
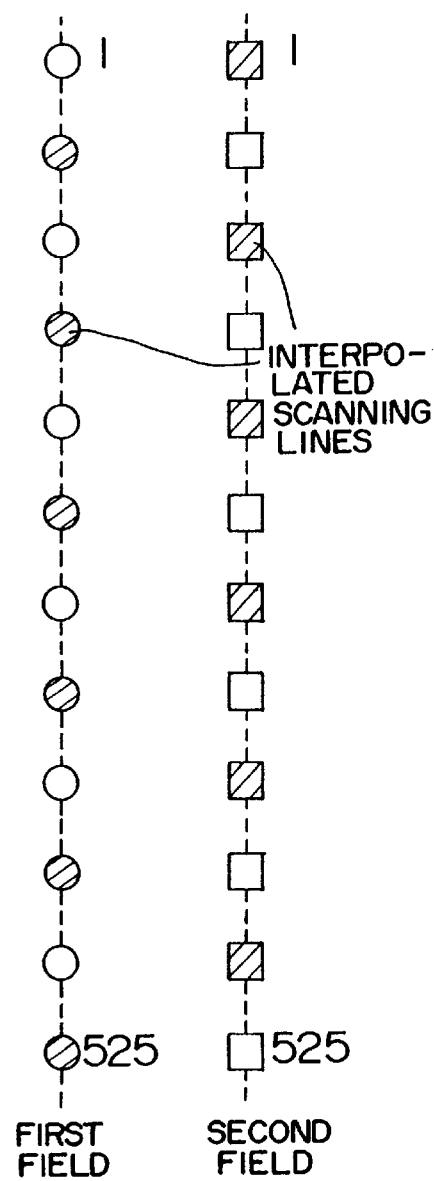

FIG. 4
(a) NTSC SIGNAL
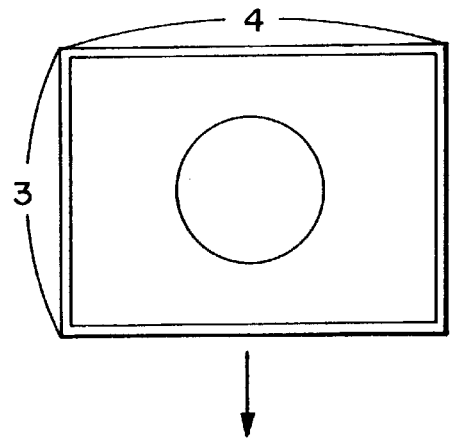
(b) REPRODUCED PICTURE
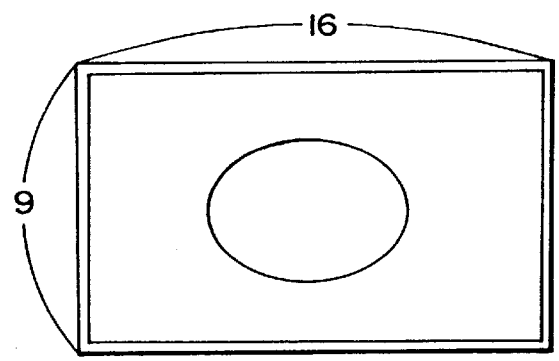
(c) FIRST DISPLAY MODE
BLANKING IMAGE
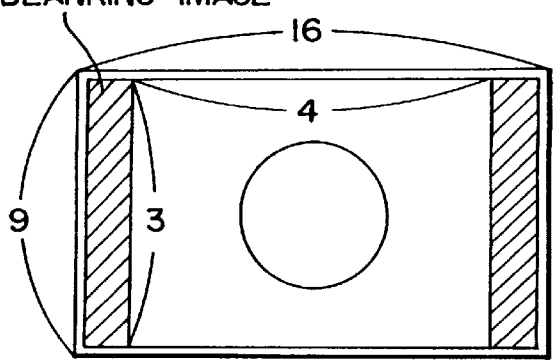
(d) SECOND DISPLAY MODE
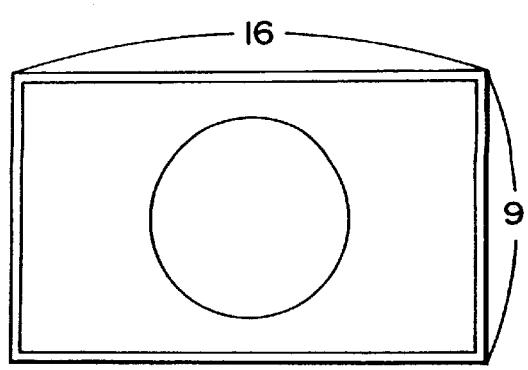

NTSC SIGNAL

VIDEO SIGNAL RECORDING AND/OR REPRODUCING APPARATUS FOR RECORDING AND/OR REPRODUCING A SIGNAL OBTAINED BY CONVERTING A NUMBER OF SCANNING LINES OF A VIDEO SIGNAL

BACKGROUND OF THE INVENTION

The present invention relates to an apparatus for recording and/or reproducing a video signal on and/or from a recording medium and in particular to a video signal recording and/or reproducing apparatus which is capable of recording and/or reproducing both a high definition signal and a standard television signal such as an NTSC signal.

Standard television systems such as the NTSC system have been used as conventional television systems. Recently, a high definition picture has been made possible by improvements in television systems. A high definition television system (HDTV: high definition TV) having about twice as many scanning lines as a standard television system and a better picture quality has been remarkably improved and it has been proposed that broadcasting of this system will be started soon. Accordingly, it is expected that both a standard television system and a high definition television system will coexist in the future. It is preferable that a future video signal recording and/or reproducing apparatus such as a VTR (video tape recorder) or a VDP (video disk player) be capable of selectively recording and/or reproducing the video signals of both systems.

A VTR which records and/or reproduces a high definition television signal has been known as described in ITEJ Technical Report Vol. 14, No. 75, Dec. 19, 1990, pp. 7–13. Although this VTR is capable of recording and/or reproducing a band compressed signal such as a multiple sub-Nyquist sampling encoding (MUSE) signal for transmitting the high definition television signal as well as the high definition television signal, it is exclusively used for high definition television.

Although the prior art VTR deals with the high definition television signal and the MUSE signal, a method of recording and/or reproducing a standard television signal such as an NTSC system signal has never been considered.

Accordingly, a user must own separate VTRs for recording and/or reproducing both high definition and standard television system video signals. This is very inconvenient from the view point of operation and economy.

SUMMARY OF THE INVENTION

It is an object of the present invention to provide a VTR apparatus which is capable of recording and/or reproducing both high definition and standard television signals.

It is another object of the present invention to reproduce the standard television signal as a video signal having a high picture quality and in the form of the high definition television signal.

It is a further object of the present invention to provide a reproduced picture having a better picture quality than that of the standard television signal even if the video signal to be recorded is the standard television signal.

In order to accomplish the above mentioned object, the present invention provides a video signal recording and/or reproducing apparatus for recording and/or reproducing a standard television signal and a high definition television signal having a broader band than that of the standard television signal, comprising recording mode presetting means for presetting one of a first recording mode in which said high definition television signal is recorded and a second recording mode in which said standard television signal is recorded; interpolation and rate doubling processing means for applying scanning line interpolation and rate doubling conversion processing for the standard television signal to output a double rate signal; high definition processing means for applying to the double rate signal outputted from said interpolation and rate doubling processing means a scanning line conversion processing to convert the double rate signal into a signal having the same format as that of the high definition television signal and the same field frequency as that of the standard television signal and an aspect ratio conversion processing to convert the double rate signal into a signal having the same aspect ratio as that of the high definition television signal; a high definition television signal recording and/or reproducing means for recording and/or reproducing the high definition signal in accordance with a given format; and servo control means for performing servo control in given recording and reproducing modes during recording and reproducing, respectively, in response to an output from said recording mode presetting means; one of said first and second recording modes being selected in response to an output from said recording mode presetting means so that the high definition television signal is recorded and/or reproduced by said recording and/or reproducing means when the first recording mode is selected and an output signal from said high definition processing means is recorded and/or reproduced by said recording and/or reproducing means when said second recording mode is selected.

Recording and/or reproducing of the video signal is similarly achieved by supplying from a television receiver having the interpolation and rate doubling processing means and high definition processing means a signal from said high definition processing means.

The first recording mode for recording the high definition signal or the second recording mode for recording the standard television signal is preset by the recording mode presetting means.

When the first recording mode is preset, the high definition television signal is supplied to the means for recording and/or reproducing the high definition television signal. The recording and/or reproducing means works to record and/or reproduce the high definition television signal in a given format. At this time, the recording and/or reproducing means performs a given servo control with the servo control means in accordance with a servo reference signal synchronized with the frame frequency (or field frequency) of the high definition television signal during both recording and reproducing. This enables the high definition television signal to be recorded and/or reproduced.

When the second recording mode is preset, the standard television signal is supplied to the interpolation and rate doubling processing means. The interpolation and rate doubling processing means performs Y/C separation, scanning line interpolation and rate doubling conversion processing for the standard television signal to output and supply a double rate signal to the high definition processing means. The high definition processing means performs horizontal time-axis compression processing or scanning line interpolation processing for the double rate luminance signal and the chrominance signal which are generated by the interpolation and rate doubling processing means for conducting scanning line conversion processing and the aspect ratio conversion processing to form a signal which is in the same format as the high definition television signal and has the same field frequency as that of the standard television signal. A signal which is formed in the high definition processing means is supplied to the recording and/or reproducing means for recording and/or reproducing the high definition television signal. The recording and/or reproducing means for recording and/or reproducing the high definition signal works to record and/or reproduce the signal formed by the high definition processing means as if it were the high definition television signal. At this time, the recording and/or reproducing means is responsive to the output from the recording mode presetting means to perform a given servo control with the servo control means in accordance with a servo reference signal synchronized with the frame frequency (or field frequency) of the signal formed in the high definition processing means during recording and to perform a given servo control with the servo control means in accordance with a servo reference signal synchronized with the frame frequency (or field frequency) of the high definition television signal during reproducing. This enables the video signal to be recorded and/or reproduced similarly to the high definition television signal even if the signal is the standard television signal. Even if both television signals have different field frequencies (or frame frequencies), the conversion of the field frequency (or frame frequency) is performed by the servo control in a very easy manner in the recording and/or reproducing process so that both signals are recorded on a recording medium in the same format. Accordingly, a reproduced video signal is in the format of the high definition television signal and has an improved picture quality compared to the NTSC signal. Even if either one of the signals is recorded on the recording medium, the video signal can be reproduced as the high definition television signal while maintaining compatibility therebetween.

Even if the double rate signal from the interpolation and rate doubling processing means is supplied from a television receiver having the interpolation and rate doubling processing means and is processed by the high definition processing means mentioned above, the standard television signal can be similarly recorded and/or reproduced and a reproduced video signal which is in the format of the high definition television signal and has an improved picture quality compared to the standard television signal can be obtained.

Even if a signal from the high definition processing means is supplied from a television receiver having the interpolation and rate doubling processing means and high definition processing means, the standard television signal can be similarly recorded and/or reproduced. A reproduced video signal which is in the format of the high definition television signal and has an improved picture quality compared to the standard television signal can be obtained.

BRIEF DESCRIPTION OF THE DRAWINGS

Preferred embodiments of the present invention will now be described in conjunction with the accompanying drawings, in which:

FIG. 3 is a diagram illustrating the operation of the interpolation and rate doubling processing circuit shown in FIG. 2;

FIG. 4 is a diagram illustrating pictures displayed on an HD display when the NTSC signal is converted into a pseudo HD signal for recording and/or reproducing the same;

DESCRIPTION OF THE PREFERRED EMBODIMENTS

Embodiments of a magnetic recording and/or reproducing apparatus such as a VTR in accordance with the present invention will be described with reference to the drawings.

Figure 1:
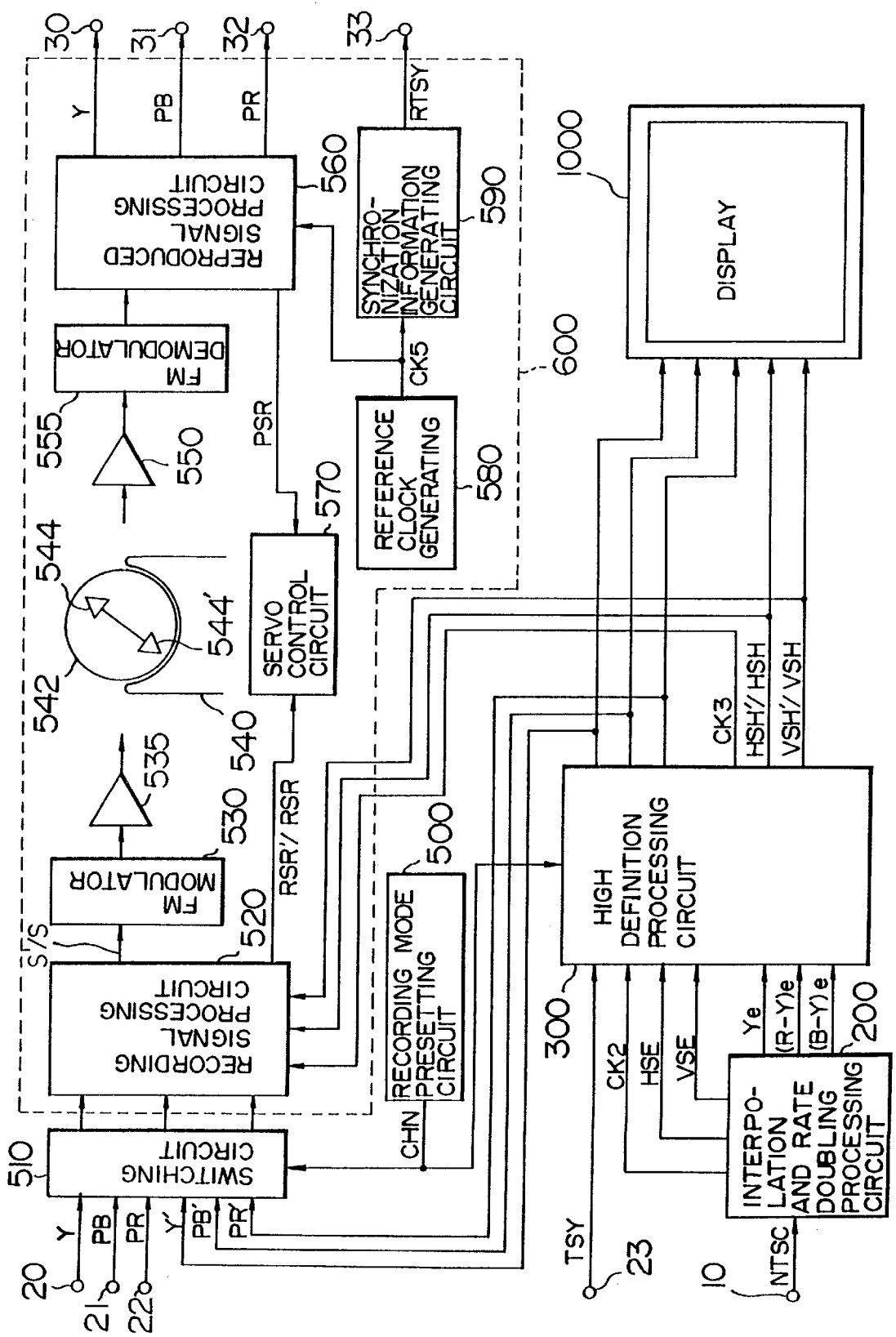
FIG. 1 is a block diagram showing a first embodiment of a video signal recording and/or reproducing apparatus of the present invention.

Referring now to FIG. 1, there is illustrated a block diagram showing a first embodiment of a magnetic recording and/or reproducing apparatus of the present invention in which both a high definition television (HDTV) signal having 1125 scanning lines, a field frequency of 60.00 Hz, an interlace ratio of 2:1 and an aspect ratio of 16:9 and a video signal which conforms to the standard television system can be recorded and/or reproduced. In the first embodiment, the standard television system video signal is, for example, an NTSC signal (525 scanning lines, a field frequency of 59.94 Hz, an interlace ratio of 2:1 and an aspect ratio of 4:3).

In FIG. 1, a reference numeral 10 denotes an input terminal for the NTSC signal; 20 to 22 input terminals for the HD signal; 23 an input terminal for a tri-state synchronization signal TSY for the HD signal; 30 to 32 output terminals for a reproduced HD signal; 33 an output terminal for a reference tri-state synchronization signal RTSY for the reproduced HD signal; 200 an interpolation and rate doubling processing circuit for converting the NTSC signal into a double rate video signal; 300 a high definition processing circuit for converting the double rate video signal into a pseudo HD signal; 500 a recording mode presetting circuit for presetting one of a mode in which the HD signal is recorded and a mode in which the NTSC signal is recorded; 510 a switching circuit for switching between the HD signal inputted from the terminals 20 to 22 and the pseudo HD signal outputted from the high definition processing circuit 300 in response to a control signal CHN from the recording mode presetting circuit 500; 520 a recording signal processing circuit which converts the HD signal into a predetermined format for recording the HD signal; 530 an FM modulating circuit; 535 a recording amplifier; 540 a recording tape; 542 a rotary drum; 544 and 544' magnetic heads; 550 a reproducing amplifier; 555 an FM demodulating circuit; 560 a reproduced signal processing circuit for restoring a signal which has been recorded in a predetermined format into the original signal; 570 a servo control circuit for controlling a drum motor and a capstan motor; 580 a reference clock generating circuit for generating a reference clock CK5 which is stable in frequency; 590 a synchronization information generating circuit for generating a reference tri-state synchronization signal RTSY which is synchronized with the reproduced HD signal; and 600 an HD signal recording and/or reproducing apparatus for recording and/or reproducing the HD signal.

The first embodiment of FIG. 1 when the NTSC signal is recorded and reproduced will be described. In this embodiment, the NTSC signal is generally recorded and reproduced by the following method. The NTSC signal is converted into a double rate video signal by the interpolation and rate doubling processing circuit 200 so that interpolation of the scanning lines and doubling of the rate of the signal is achieved. The double rate video signal is then converted into a pseudo HD signal (1125 scanning lines, a field frequency of 59.94 Hz, an interlace ratio of 2:1 and an aspect ratio of 16:9) by the high definition processing circuit 300. The NTSC signal is recorded and reproduced by the HD signal recording and/or reproducing apparatus 600 as if the NTSC signal were the HD signal when the NTSC signal is converted into the pseudo HD signal in such a manner. Basic parameters of each signal are shown in the following Table. The first embodiment will now be described in more detail.

doubling processing circuit 200 performs Y/C (luminance signal/chrominance signal) separation, scanning line interpolation and rate doubling processing. The interpolation and rate doubling processing circuit 200 which converts the NTSC signal into the double rate video signal has heretofore been known in the EDTV receiver art. An example of the interpolation and rate doubling processing circuit 200 will be described in detail with reference to FIG. 2.

Figure 2:
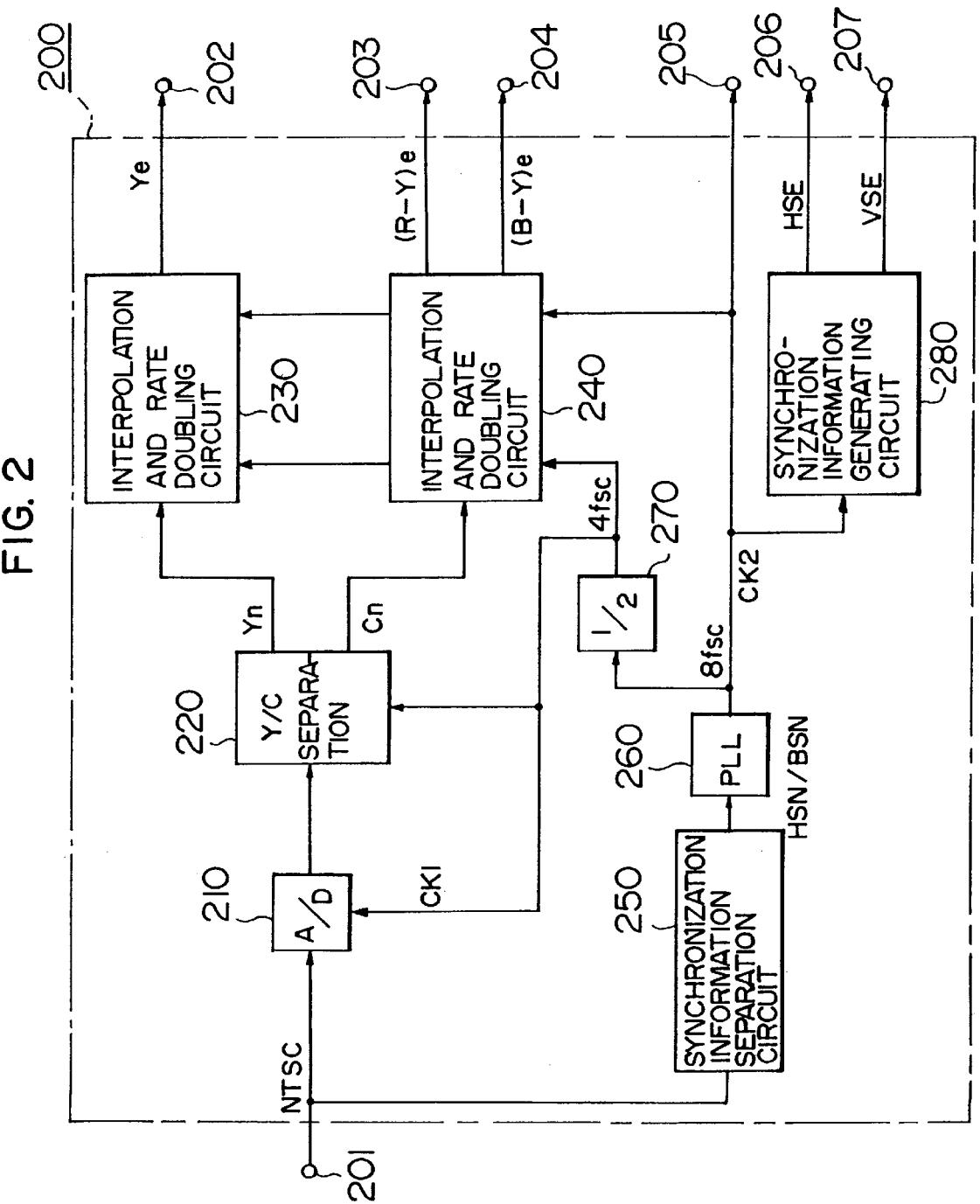
FIG. 2 is a block diagram showing an example of the interpolation and rate doubling processing circuit shown in FIG. 1.

In FIG. 2, the NTSC signal which has been inputted from an NTSC signal input terminal 201 is supplied to an A/D converter 210 and a synchronization information separation circuit 250. The synchronization information separation circuit 250 separates synchronization information signals such as a horizontal synchronization signal HSN, a vertical synchronization signal VSN and a burst signal BSN which are multiplexed in the NTSC signal. The horizontal synchronization signal HSN or the burst signal BSN is supplied to a PLL (phase locked loop) circuit 260. The PLL circuit 260 comprises a phase comparator and a voltage controlled oscillator, etc., and generates a clock CK2 having a frequency of 8fsc and a color subcarrier frequency of 3.58 MHz which is in phase synchronized with the horizontal synchronization signal HSN or the burst signal BSN. The clock CK2 is supplied to a frequency dividing circuit 270 and interpolation and rate doubling circuits 230 and 240. The frequency dividing circuit 270 divides the frequency of the clock CK2 by two so that a clock CK1 having a frequency of 4 fsc is generated. The clock CK1 is supplied to A/D converter 210, a Y/C separation circuit 220, and the interpolation and rate doubling circuits 230 and 240. Accordingly, the NTSC signal which is inputted to the A/D converter 210 is sequentially converted into a digital signal from an analog signal in

TABLE

| | SIGNAL | | | |
|---|---|---|---|---|
| PARAMETERS | NTSC SIGNAL | ED SIGNAL | PSEUDO HD SIGNAL | HD SIGNAL |
| NUMBER OF SCANNING LINES | Ln: 525 Lines | Le: 525 Lines | Lh': 1125 Lines | Lh: 1125 Lines |
| FIELD FREQ. | fvn: 59.94 Hz | fve: 59.94 Hz | fvh': 59.94 Hz | fvh: 60.00 Hz |
| HORIZONTAL SCANNING FREQ. | fhn: 15.734 kHz | fhe: 31.468 kHz (=2fhn) | fhh': 33.716 kHz $\left(= fhh \cdot \frac{fvh'}{fvh}\right)$ | fhh: 33.750 kHz |
| INTERLACE RATIO | 2:1 | 1:1 | 2:1 | 2:1 |
| ASPECT RATIO | An: 4/3 (4:3) | Ae: 4/3 (4:3) | Ah': 16/9 (16:9) | Ah: 16/9 (16:9) |
| NUMBER OF EFFECTIVE LINES | 485 Lines | 485 Lines | 1035 Lines | 1035 Lines |
| EFFECTIVE VIDEO PERIOD IN ONE LINE | Tn: 52.66 µs | Te: 26.33 µs (=Th/2) | Th': 24.83 µs $\left(= Th \cdot \frac{fvh'}{fvh}\right)$ | Th: 24.86 µs |

In FIG. 1, the NTSC signal which has been inputted from the NTSC signal input terminal 10 is supplied to the interpolation and rate doubling processing circuit 200. The interpolation and rate doubling processing circuit 200 is adapted to convert the supplied NTSC signal into a double rate video signal, which is an Extended Definition TV system video signal (hereinafter referred to as an ED signal) having 525 scanning lines, a field frequency of 59.94 Hz, an interlace ratio of 1:1 (non-interlace), and an aspect ratio of 4:3 as shown in the Table. Thus, the interpolation and rate synchronization with the clock CK1 and is supplied to the Y/C separation circuit 220. After the NTSC signal which has been converted into a digital signal is separated into a luminance signal Yn and a chrominance signal Cn by the Y/C separation circuit 220, the signals Yn and Cn are supplied to the interpolation and rate doubling circuits 230 and 240, respectively. Each of the interpolation and rate doubling circuits 230 and 240 comprises a field memory and a line memory. A summary of the processing in the interpolation and rate doubling circuits will be described with reference to FIG. 3 wherein (a) is a diagram showing the structure of scanning lines of NTSC signal and (b) is a diagram showing the structure of scanning lines of the ED signal which is obtained by interpolation and rate doubling processing the NTSC signal. The interpolation and rate doubling circuits 230 and 240 interpolate the scanning lines of the NTSC signal (the luminance signal Yn and the chrominance signal Cn) of (a) to provide the interpolated scanning lines of (b) and then the NTSC signal which is sampled at the clock CK1 (frequency=4 fsc ) is read from a memory at a clock CK2 (frequency=8 fsc) for doubling the rate of the signal. Accordingly, the interpolation and rate doubling circuits 230 and 240 output luminance signal Ye, and chrominance signals (R-Y)e and (B-Y)e of the ED signal which are obtained by interpolation and rate doubling processing the NTSC signal to provide 525 scanning lines, a field frequency of 59.94 Hz, an interlace ratio of 1:1 (non-interlace) and an aspect ratio of 4:3. The signals Ye, (R-Y)e and (B-Y)e are supplied to terminals 202 to 204, respectively. Furthermore, a synchronization information generating circuit 280 generates horizontal and vertical synchronization signals HSE and VSE for the ED signal in synchronization with the clock CK2 and supplies them to terminals 206 and 207. The clock CK2 is supplied to terminal 205.

Referring again to FIG. 1, the thus generated ED signal is supplied to the high definition processing circuit 300. Furthermore, to the high definition processing circuit 300 are also supplied the clock CK2 and the horizontal and vertical synchronization signals HSE and VSE outputted from the interpolation and rate doubling processing circuit 200, the tri-state synchronization signal TSY for the ED signal outputted from the terminal 23 and a control signal CHN from the recording mode presetting circuit 500. The high definition processing circuit 300 converts the supplied ED signal into a signal similar to the HD signal but having the same field frequency as that of the inputted NTSC signal as shown in the Table, that is, a pseudo HD signal having 1125 scanning lines, a field frequency of 59.94 Hz, an interlace ratio of 2:1 and an aspect ratio of 16:9. Specifically, the circuit 300 performs the scanning line conversion processing and the aspect ratio conversion processing. The scanning line conversion processing converts the ED signal into a signal having 1125 scanning lines, a field frequency of 59.94 Hz and an interlace ratio of 2:1. The aspect ratio conversion processing will now be described briefly. If the pseudo HD signal which has been converted from the NTSC signal is recorded or reproduced in the HD signal recording and/or reproducing apparatus as if it were the HD signal and is displayed on an HD display having an aspect ratio of 16:9, distortion wherein a circle as shown in (a) of FIG. 4 is elongated in a horizontal direction and is displayed as an ellipse as shown in (b) of FIG. 4 occurs due to the difference in aspect ratios of the NTSC and HD signals so that an incorrect picture is displayed. In FIG. 4, (a) shows the NTSC signal displayed on an NTSC display having an aspect ratio of 4:3, and (b) shows the pseudo HD signal which has been converted from the NTSC signal and has been recorded and/or reproduced by the HD signal recording and/or reproducing apparatus 600 displayed on an HD display having an aspect ratio of 16:9. In order to prevent such distortion, the high definition processing circuit 300 time-axis compresses the video signal in a horizontal direction so that the reproduced picture is displayed as a circle as shown in (c) of FIG. 4 (hereinafter referred to as the first display mode) simultaneously with the scanning line conversion processing when the ED signal is converted into the pseudo HD signal.

Alternatively, the high definition processing circuit 300 interpolates the scanning lines of the video signal to elongate the video signal in a vertical direction so that the reproduced picture is displayed as a circle as shown in (d) of FIG. 4 (hereinafter referred to as the second display mode). The time-axis compression processing in a horizontal direction and the elongation processing in a vertical direction are referred to as aspect ratio conversion processing. If the parameters of each signal shown in the Table are used, the ratio of the time axis compression in a horizontal direction in the first display mode is defined by equation (1) as follows:

$$X = \frac{Le \cdot Ae}{(Lh/2) \cdot Ah} = 0.7 \quad (1)$$

wherein Le denotes the number of scanning lines of the ED signal in a frame; Ae denotes the aspect ratio of the ED signal; Lh denotes the number of the scanning lines of the HD signal; and Ah denotes the aspect ratio of the HD signal.

The elongation in a vertical direction in the second display mode is defined by equation (2) as follows:

$$Z = \frac{Ah}{An} = \frac{4}{3} \quad (2)$$

wherein An and Ah denote the aspect ratios of the NTSC and HD signals, respectively.

Figure 5:
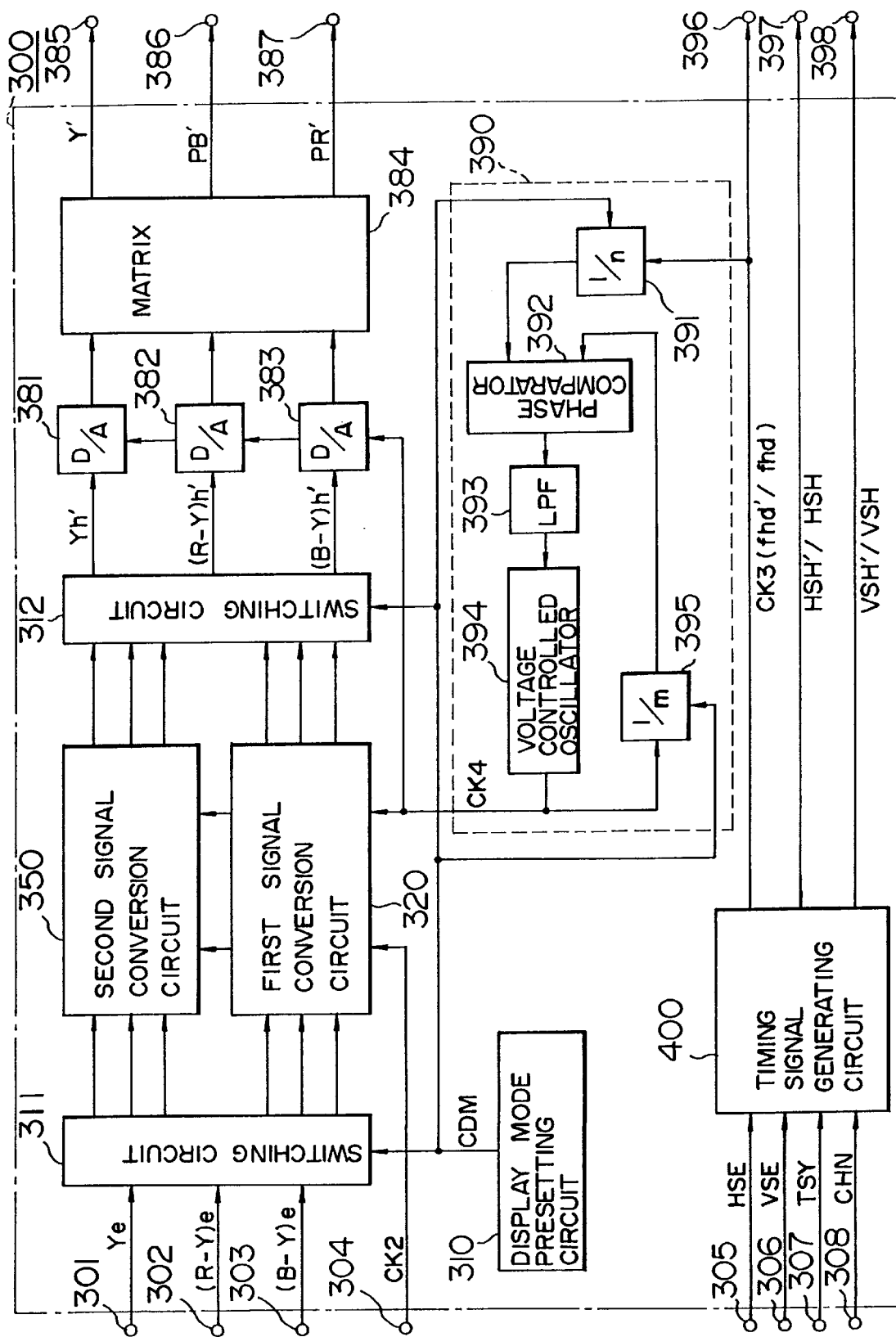
FIG. 5 is a block diagram showing an example of the high definition processing circuit shown in FIG. 1.

An example of the high definition processing circuit 300 is shown in FIG. 5. The high definition processing circuit 300 will be described with reference to FIG. 5. The luminance signal Ye and the chrominance signals (R-Y)e and (B-Y)e of the ED signal which are inputted to terminals 301 to 303 from the interpolation and rate doubling processing circuit 200 are supplied to a switching circuit 311. A display mode presetting circuit 310 presets one of the first and second display modes and outputs a control signal CDM corresponding to the preset display mode. The switching circuit 311 is responsive to the control signal CDM from the display mode presetting circuit 310 to supply the ED signal to first and second signal conversion circuits 320 and 350 in the first and second display modes, respectively. The first signal conversion circuit 320 is a signal processing circuit operative in the first display mode and comprises a memory and the like. The first signal conversion circuit 320 time-axis compresses (compression factor X) the video signal in a horizontal direction to perform the aspect ratio conversion processing simultaneously with the above mentioned scanning line conversion processing. Specifically, the first signal conversion circuit 320 converts the ED signal into the pseudo HD signal. The second signal conversion circuit 350 is a signal processing circuit operative in the second display mode and comprises a memory, etc., similarly to the first signal conversion circuit 320. The second signal conversion circuit 350 elongates (elongation factor Z) the video signal in a vertical direction by interpolating the scanning lines to perform the aspect ratio conversion processing simultaneously with the scanning line conversion processing to convert the ED signal into the pseudo HD signal. Although in the first embodiment of the present invention, the ED signal which has been inputted via the terminals 301 to 303 is selectively supplied to the first and second signal conversion circuits 320 and 350 via the switching circuit 311 as mentioned above, the ED signal which has been inputted from the terminals 301 to 303 may be simultaneously supplied to the first and second signal conversion circuits 320 and 350 without passing through the switching circuit 311.

Figure 6:
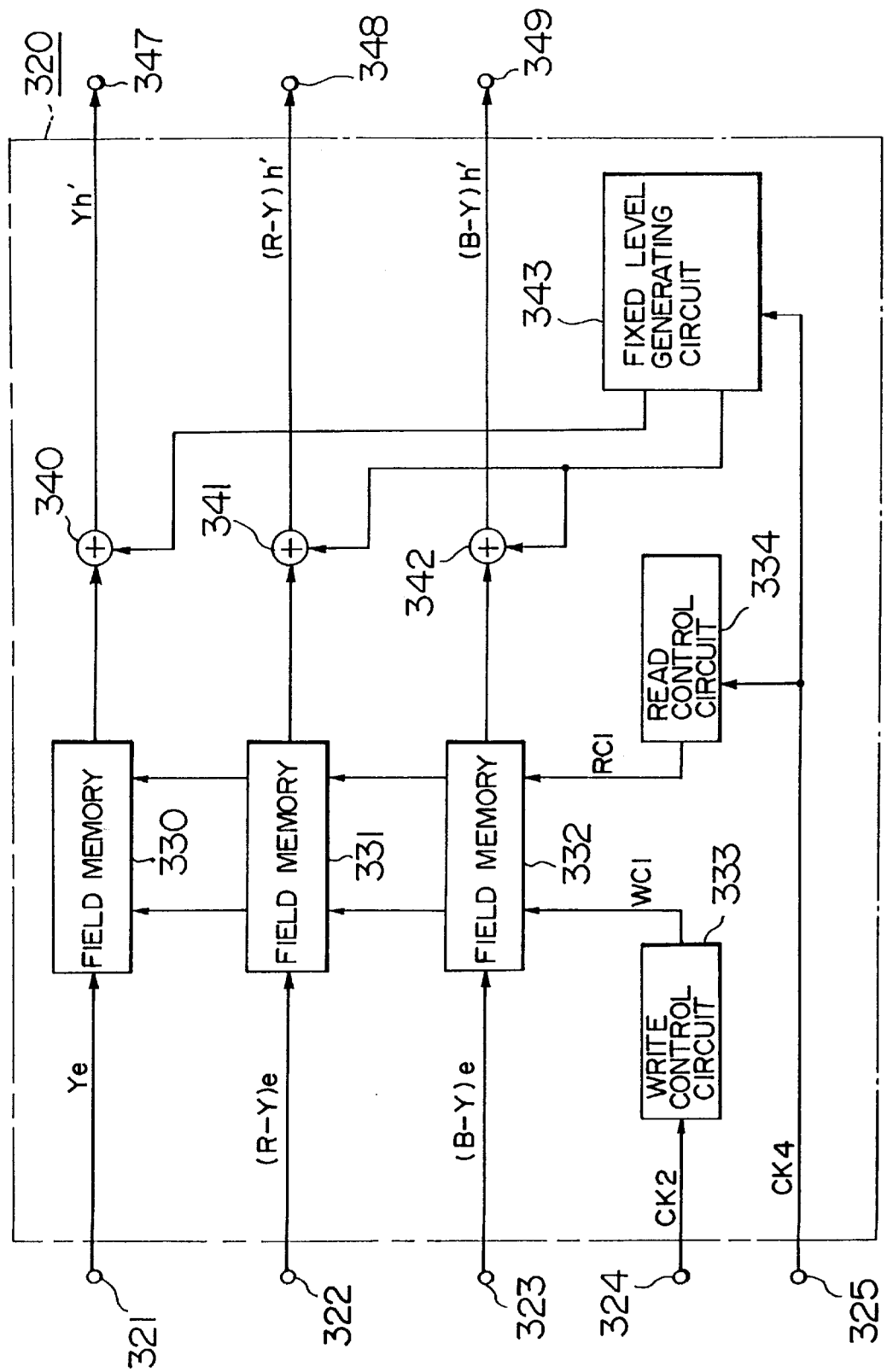
FIG. 6 is a block diagram showing an example of the first signal conversion circuit shown in FIG. 5.

An example of the first signal conversion circuit 320 is shown in FIG. 6. In FIG. 6, reference numerals 321 to 323 denote input terminals for the luminance signal Ye and the chrominance signals (R-Y)e and (B-Y)e; 324 an input terminal for clock CK2 (frequency=8 fsc) supplied from the interpolation and rate doubling processing circuit 200; 325 an input terminal for a clock CK4 (frequency=f4) which will be described hereafter; 330 to 332 field memories; 333 a write control circuit for generating a write control signal WC1 for the field memories 330 to 332; 334 denotes a read control circuit for generating a read control signal RC1 for the field memories 330 to 332; 340 to 342 adders; 343 a fixed level generating circuit; and 347 to 349 output terminals for a luminance signal Yh' and chrominance signals (R-Y)h' and (B-Y)h' of the pseudo HD signal.

Operation of the first signal conversion circuit 320 shown in FIG. 6 will be described with reference to FIGS. 7 and 8 and the luminance signal Ye of the ED signal.

Figure 7:
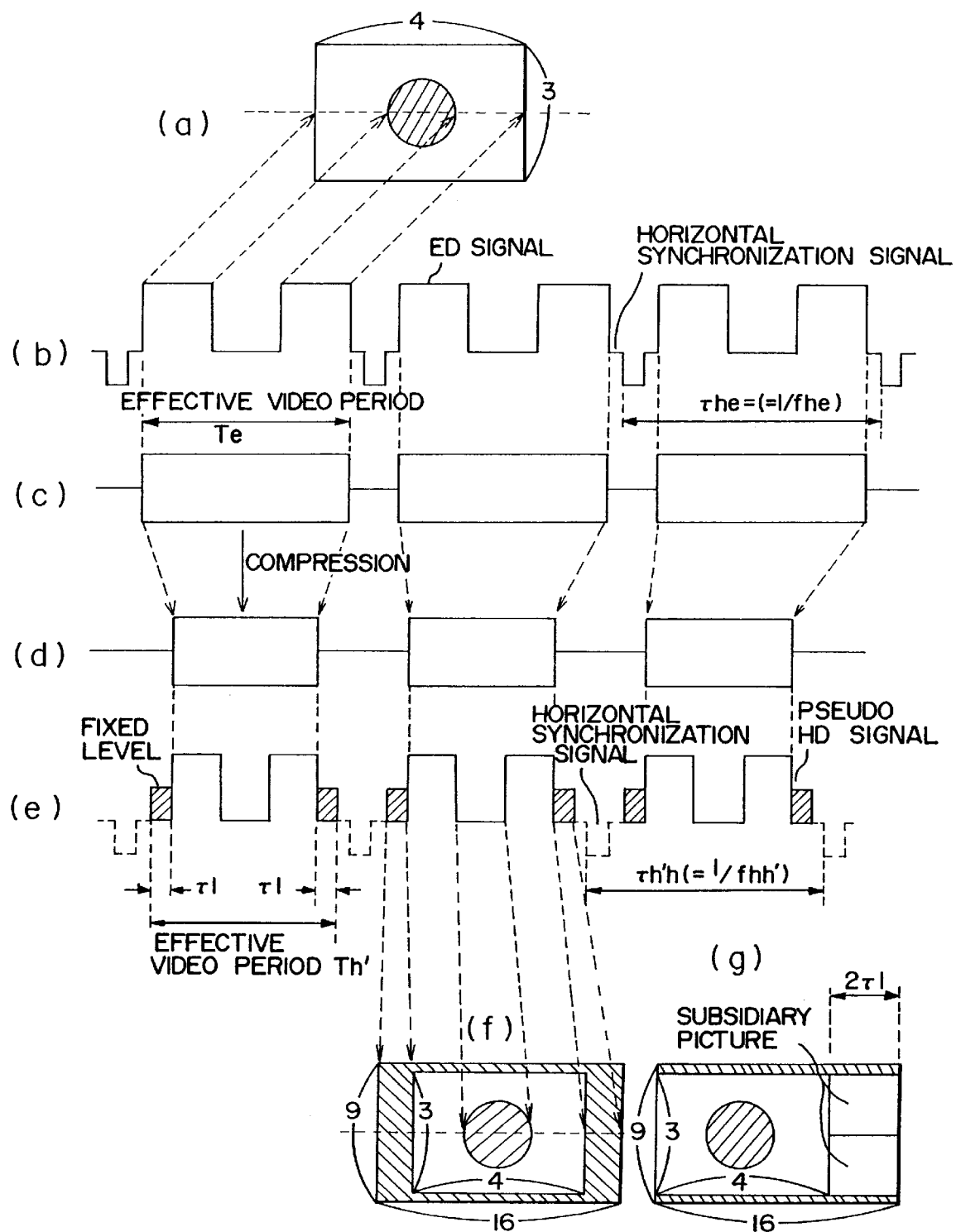
FIG. 7 is a diagram explaining the operation of the first signal conversion circuit shown in FIG. 6.
Figure 8:
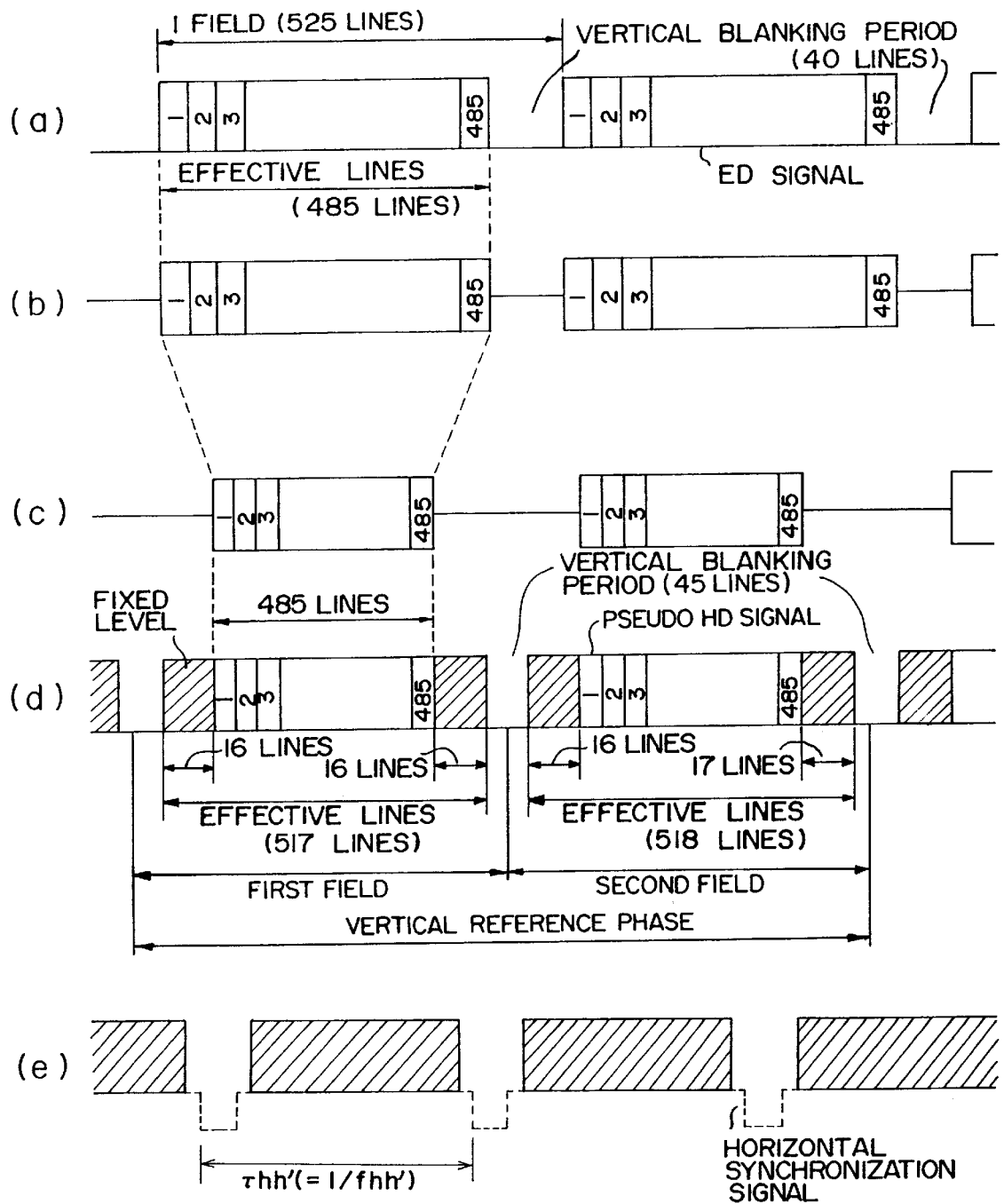
FIG. 8 is a diagram explaining the operation of the first signal conversion circuit shown in FIG. 6.

The luminance signal Ye of the ED signal in FIGS. 7 and 8 inputted from the terminal 321 is supplied to the field memory 330. The luminance signal Ye of the ED signal is a video signal formatted for the display of the aspect ratio of 4:3 as shown in (a) of FIG. 7. The supplied luminance signal Ye as shown in (b) of FIG. 7 and (a) of FIG. 8 is serially written into the field memory 330 in response to the clock CK2 synchronized therewith and the write control signal WC1 generated by the write control circuit 333. At this time, no unnecessary video information such as horizontal and vertical blanking periods is written in the field memory 330 and only the effective video information such as the effective lines (485 lines) is written in the field memory 330 as shown in (c) of FIG. 7 and (b) of FIG. 8. The effective video information which has been written in the field memory 330 is read in response to the clock CK4 and the read control signal RC1 generated by the read control circuit 334. At this time, the scanning line conversion processing is performed simultaneously with the aspect ratio conversion processing. This processing can be comparatively easily performed by presetting the frequency f4 of the clock CK4 at a frequency which is N times (N is an integer) as high as the horizontal scanning frequency fhh'(=33.716 kHz) of the pseudo HD signal and about Te/(Th'.X) times as high as the frequency (=8 fsc) of the clock CK2 wherein Te is the effective video period in a line of the ED signal which is 26.33 $\mu$s and Th' denotes the effective video period in a line of the pseudo HD signal which is 24.83 $\mu$s. In other words, the luminance signal Ye of the ED signal can be converted into the luminance signal Yh' of the pseudo HD signal shown in the Table by time-axis compressing in a horizontal direction by serially reading the effective video information of each line written in the field memory in response to the clock CK4 at a horizontal scanning period $\tau$hh' (=1/fhh'=29.66 $\mu$s) of the pseudo HD signal as shown in (d) of FIG. 7 and (c) of FIG. 8. At this time, interlacing of the pseudo HD signal can be easily achieved by shifting the reading start position of the second field from the reading start position of the first field by 0.5 line in advance or behind with respect to a vertical reference phase when the effective video information is read from the field memory 330.

Specifically, this is achieved, for each of the first and second fields, the effective video information of 485 lines read out of the field memory 330 is made effective video information of the pseudo HD signal, and the start position of effective lines of the second field with respect to the vertical reference phase is shifted (in advance or behind) by 0.5 H from the start position of effective lines of the first field. Alternatively, the interlacing may be achieved in the following manner.

In more detail, in the first find, the effective video information of 485 lines read out of the field memory 330 is made as it is the effective video information of the pseudo HD signal. In the second field, the effective video information of 485 lines read out of the field memory 330 is supplied to a vertical filter which performs averaging and addition of effective video information of adjacent two lines, and the effective video information of 485 lines outputted from the vertical filter is made the effective video information of the pseudo HD signal. Then, the interlacing may be achieved in which the start position of effective lines of the second field outputted from the vertical filter with respect to the vertical reference phase is shifted (in advance or behind) by 0.5 H from the start position of effective lines of the first field read out of the field memory 330.

Specifically, the interlacing may be achieved by using the effective video information of 485 lines read out of the field memory 330 as effective video information of both the first field and the second field of the pseudo HD signal, and shifting a start position of the effective video information of the second field by 0.5 line ahead or behind with respect to the vertical reference phase from a start position of the effective video information of the first field.

Alternatively, the interlacing may be achieved in the following manner. The effective video information of 485 lines read out of the field memory 330 is used as effective video information of the first field of the pseudo HD signal. The effective video information of 485 lines read out of the field memory 330 is also supplied to a vertical filter which averages effective video information of each pair of adjacent lines to produced averaged effective video information of 485 lines. The averaged effective video information of 485 lines produced by the vertical filter is used as effective video information of the second field of the pseudo HD signal. The start position of the effective video information of the second field is shifted by 0.5 line ahead or behind with respect to the vertical reference phase from a start position of the effective video information of the first field.

The clock CK4 is generated by the PLL circuit 390 in FIG. 5. The details thereof will be described hereafter. A fixed level signal which is generated by the fixed level generating circuit 343 in response to the clock CK4 is added by the adder 340 to the pseudo HD signal during a period $\tau_1$ of the effective video period Th' which is generated by time-axis compressing and reading the effective video information as shown in (e) of FIG. 7.

Since the number of effective lines of the ED signal (485 lines per each field) is changed (517 lines in the first field and 518 lines in the second field) by the scanning line conversion processing and the aspect ratio conversion processing, 32 and 33 effective lines are omitted in the first and second fields, respectively, in the pseudo HD signal. The fixed level signal which is generated by the fixed level generating circuit 343 in response to the clock CK4 is added to the pseudo HD signal during periods corresponding to the omitted lines as shown in (d) of FIG. 8. The omitted lines are substantially equally assigned to the leading and trailing ends of each field as shown in (d) of FIG. 8 and the fixed level signal is added thereto. By performing the scanning line conversion and aspect ratio conversion as mentioned above, a signal having the same format as the HD signal and the same field frequency as the NTSC signal, i.e. the luminance signal Yh' of the pseudo HD signal having 1125 scanning lines, a field frequency of 59.94 Hz, an interlace ratio of 2:1 and an aspect ratio of 16:9, can be formed. A reproduced picture as shown in (f) of FIG. 7 having no distortion can be displayed within both right and left sides and upper and lower sides on the screen of the HD display having an aspect ratio of 16:9 by recording and reproducing the luminance signal Yh' of the pseudo HD signal by the HD signal recording and/or reproducing apparatus 600 of FIG. 1.

Although the fixed level signal is added for the blank period $\tau_1$ of the effective video period Th' which is formed by time-axis compressing and reading the effective video information, subsidiary pictures may be formed as shown in (g) of FIG. 7 by multiplexing other video signals other than the fixed level signal, for example, other compressed video signals.

The luminance signal Yh' and chrominance signals (R-Y)h' and (B-Y)h' of the pseudo HD signal can be supplied to the terminals 347 to 349, respectively, by performing the scanning line conversion and the aspect ratio conversion for the chrominance signals (R-Y)e and (B-Y)e of the ED signal inputted from the terminals 322 and 323, respectively, similarly to the luminance signal Ye.

Figure 9:
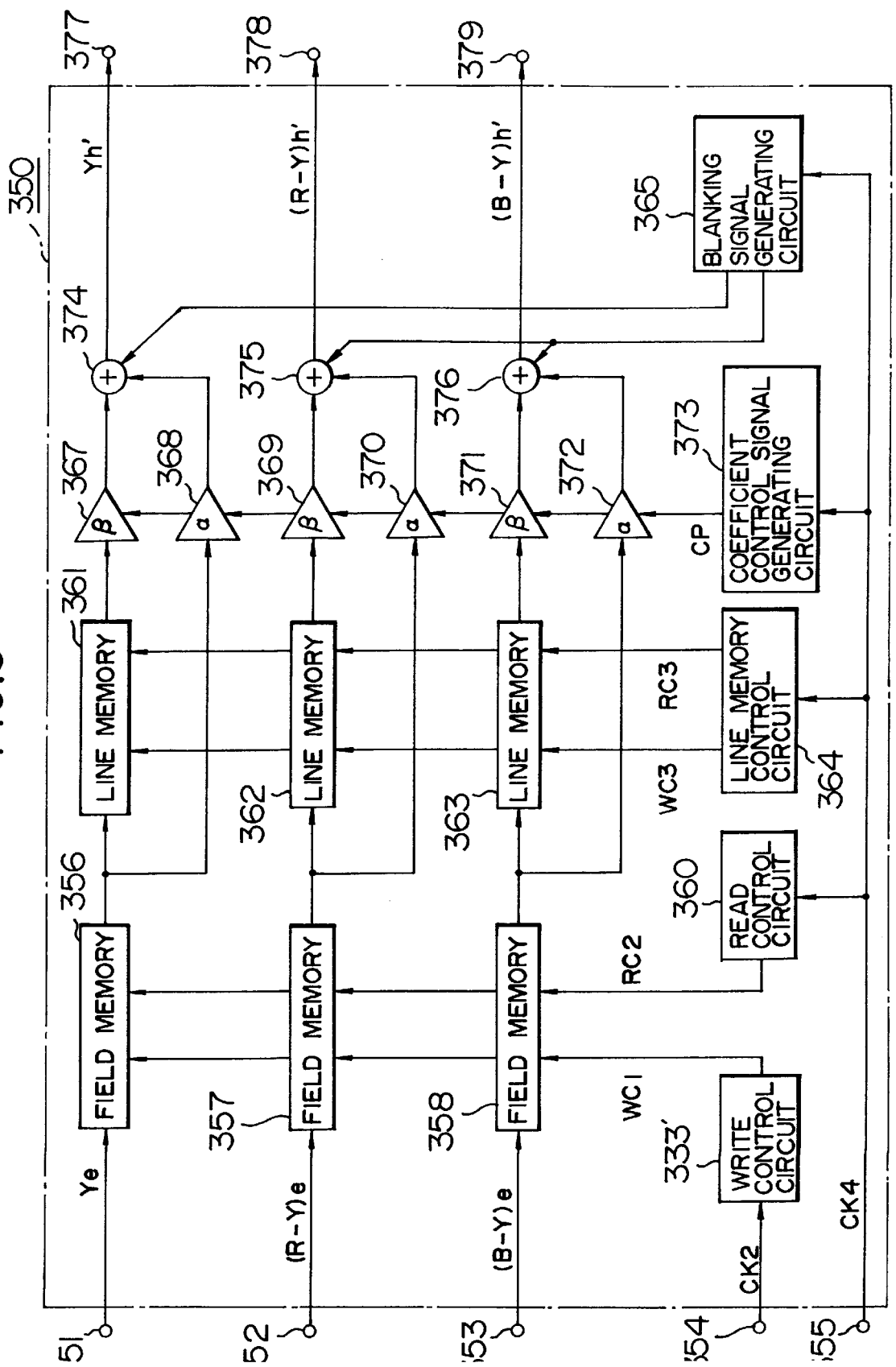
FIG. 9 is a block diagram showing an example of the second signal conversion circuit shown in FIG. 5.

An example of the second signal conversion circuit 350 which performs the scanning line conversion and elongation in a vertical direction as mentioned above is shown in FIG. 9. In FIG. 9, reference numerals 351 to 353 denote input terminals for the luminance signal Ye and the chrominance signals (R-Y)e and (B-Y)e of the ED signal, respectively; 354 denotes an input terminal for the clock CK2 (frequency=8 fsc) supplied from the interpolation and rate doubling processing circuit 200; 355 denotes an input terminal for a clock CK4 (frequency =f4) which will be described hereafter; 356 to 358 field memories; 333' a write control circuit similar to the write control circuit 333 of FIG. 6 for generating a write control signal WC1 for the field memories 356 to 358; 360 a read control circuit for generating a read control signal RC2 for the field memories 356 to 358; 361 to 363 line memories; 364 a line memory control circuit for generating write and read control signals WC3 and RC3 for the line memories 361 to 363; 365 a blanking signal generating circuit; 367 to 372 coefficient multipliers; 373 a coefficient control signal generating circuit for generating a coefficient control signal CP for controlling the coefficients of the coefficient multipliers 367 to 372; 374 to 376 adders; and 377 to 379 output terminals for the luminance signal Yh' and chrominance signals (R-Y)h' and (B-Y)h' of the pseudo HD signal, respectively.

Operation of the second signal conversion circuit 350 shown in FIG. 9 will be described by way of an example of the luminance signal Ye of the ED signal with reference to FIGS. 10 and 11 which are diagrams for explaining the operation.

The luminance signal Ye of the ED signal inputted from the terminal 351 is supplied to the field memory 356. The luminance signal Ye of the ED signal is a video signal formatted for a display having an aspect ratio of 4:3 as shown in (a) of FIG. 10. The supplied luminance signal Ye is serially written into the field memory 356 in response to the clock CK2 synchronized therewith and the write control signal WC1 generated by the write control circuit 333'. At this time, no unnecessary video information such as horizontal and vertical blanking periods is written in the field memory 356 and only the effective video information such as the effective lines (485 lines) is written in the field memory 356 as shown in (c) of FIG. 10. The effective video information which has been written in the field memory 356 is read in response to the clock CR4 and the read control signal RC1 generated by the read control circuit 360.

Figure 10:
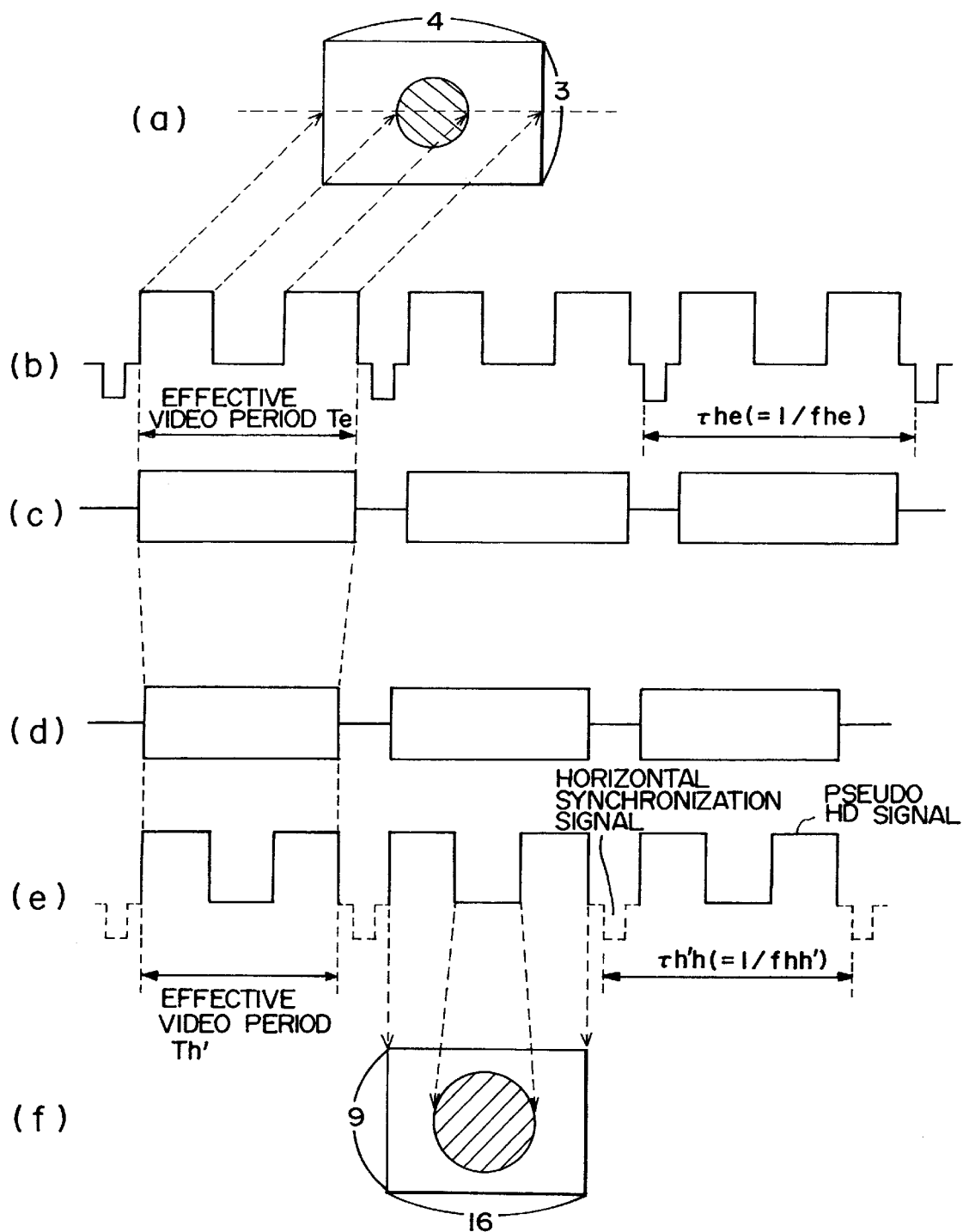
FIGS. 10–12 are diagrams illustrating the operation of the second signal conversion circuit shown in FIG. 9.

At this time, the effective video information of each line which is written in the field memory 356 can be read at a horizontal scanning cycle τhh' (=1/fhh'=29.66 μs) as shown in (d) and (e) of FIG. 10 by presetting the frequency f4 of the clock CK4 (which is different from the frequency in the case where the clock CK4 is supplied to the first signal conversion circuit 320) M times (M is an integer) as high as the horizontal scanning frequency fhh' of the pseudo HD signal (=33.716 kHz) and about Te/Th' times the frequency=8 fsc) of the clock CK2 wherein Te denotes the effective video period in one line of the ED signal (=26.33 μs) and Th' denotes the effective video period in one line of the pseudo HD signal (=24.83 μs). In this case, a reproduced picture having no distortion as shown in (f) of FIG. 10 can be displayed. Since the reproduced picture is only elongated in a vertical direction, no color distortion is caused and the edge of the picture is not bent. Since the reproduced picture is elongated in a vertical direction, the elongated upper and lower portions of the picture are not displayed. The clock CK4 is generated by the PLL circuit 390 in FIG. 5. The details thereof will be described hereafter. FIG. 11 is a diagram showing the structure of the scanning lines for explaining the second signal conversion circuit 350. In FIG. 11, (a) shows the ED signal inputted to the field memory 356, and (b) shows the signal of each line which is read from the field memory 356 at the horizontal scanning period τhh' of the pseudo HD signal as mentioned above. As shown in (b), the field memory 356 reads the signal of each line at the horizontal scanning period τhh' of the pseudo HD signal, and simultaneously with this is controlled in response to the read control signal WC1 so that reading of one line is stopped after 3 lines are read for performing the aspect ratio conversion by elongating the video signal in a vertical direction (elongation Z=4/3; 3 scanning lines are increased to 4 scanning lines).

The video information which is read from the field memory 356 in such a manner is supplied to a line memory 361 and a coefficient multiplier 368. The line memory 361 is controlled in response to the clock CK4 and the write control signal WC3 and the read control signal RC3 which are generated by the line memory control circuit 364 so that the video signal from the field memory 356 is serially written in the line memory 361 and is read after one line. When a line has not been read from the field memory 356, the line memory 361 is controlled to again read the signal of the previous line. By controlling the line memory in such a manner, the video information of each line is outputted from the line memory 361 and is supplied to the coefficient multiplier 367 as shown in (c) of FIG. 11. The video signals supplied to the coefficient multipliers 367 and 368 are multiplied by respective coefficients (β and α) and the multiplied signals are then supplied to an adder 374 in which they are added to each other in line units. The coefficients β and α of the coefficient multipliers 367 and 368 are controlled in line units in response to the coefficient control signal CP generated by the coefficient control signal generating circuit 373. If the coefficients α and β are controlled as shown in (d) of FIG. 11, the number of the scanning lines from the adder 374 is increased to 4/3 times and the luminance signal Yh' of the pseudo HD signal having a horizontal scanning period τhh' can be obtained.

Figure 11:
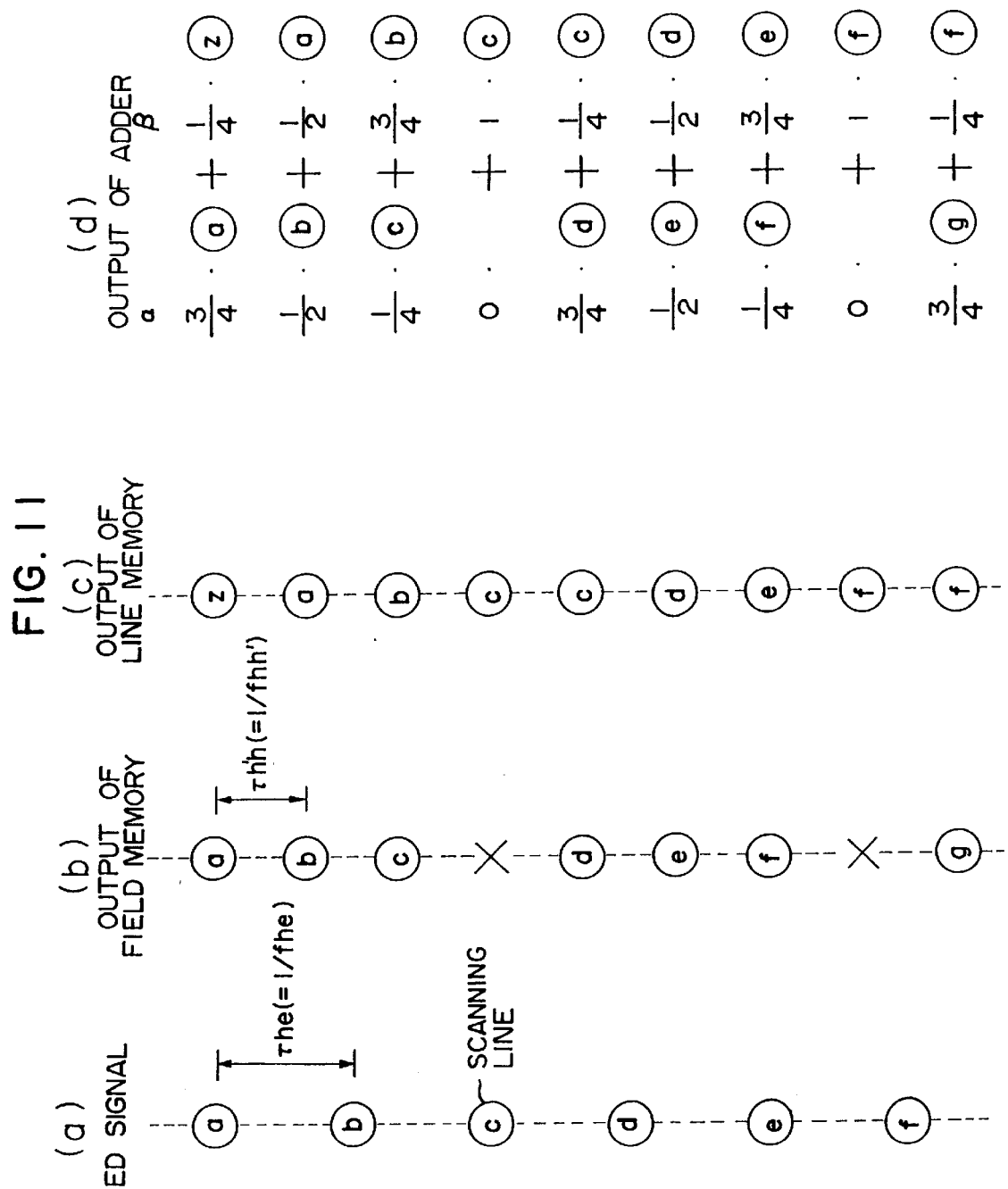
Figure 12:
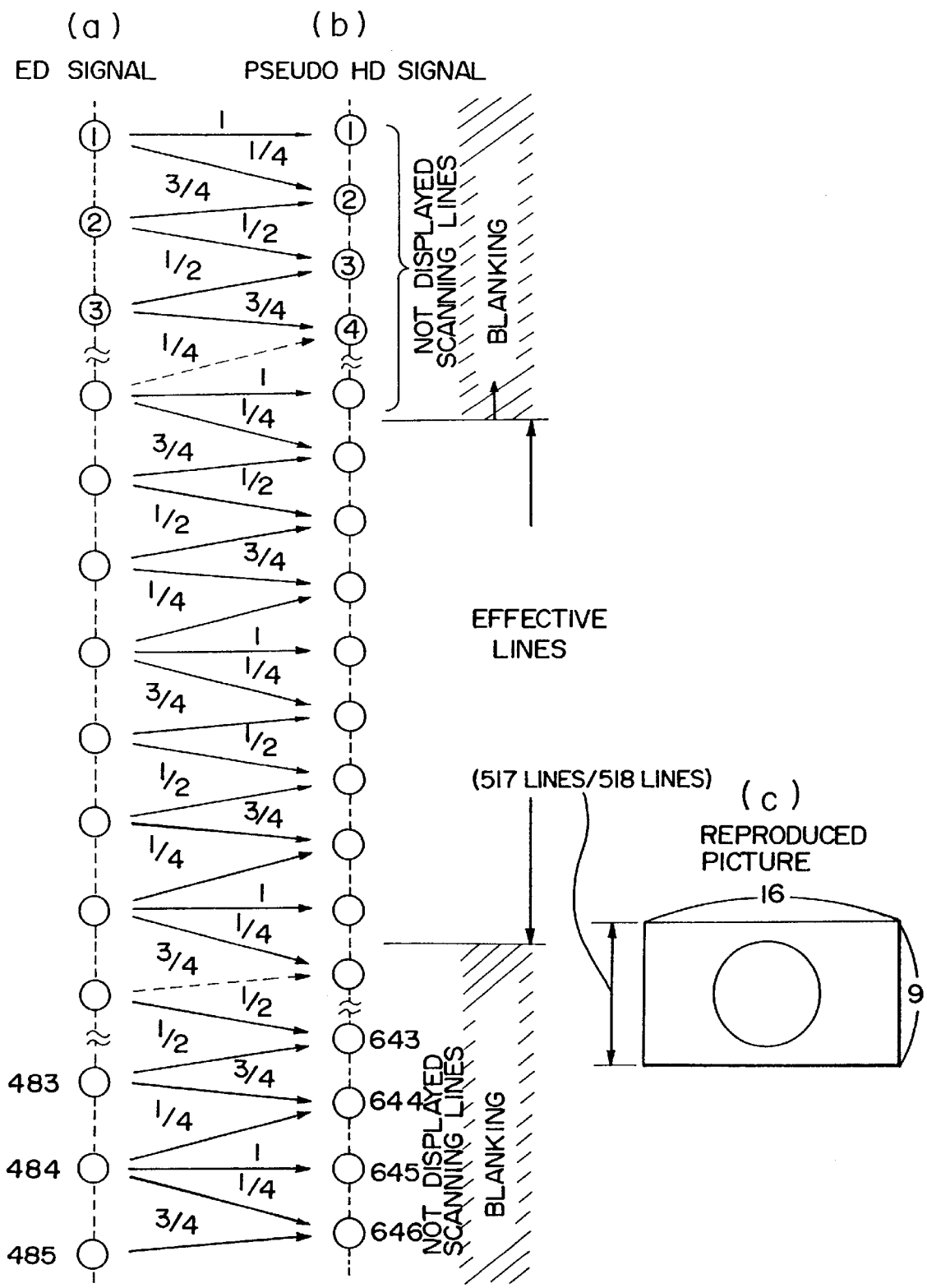

FIG. 12 is a diagram showing how the luminance signal Yh' formed as shown in (d) of FIG. 11 is enlarged in a vertical direction by the interpolation of the scanning lines and is displayed. In FIG. 12, (a) is a diagram showing the structure of the scanning lines (effective lines) of the ED signal supplied to the field memory 356, and (b) is a diagram showing the structure of the scanning lines of the luminance signal Yh' which is formed as mentioned above. An effective 646 lines of the luminance signal Yh' can be formed from an effective 485 lines of the luminance signal Ye of the ED signal. The effective lines of the pseudo HD signal, however, comprise 517 lines in the first field and 518 lines in the second field. Accordingly, as shown in (b) of FIG. 12, the 517 (or 518) scanning lines in the center of the screen in each field are made the effective lines of the pseudo HD signal and a blanking signal which is generated by the blanking signal generating circuit 365 is added to the lines other than the effective lines.

Interlacing of the pseudo HD signal can be easily performed by shifting the reading start position of the second field from the reading start position of the first field by 0.5 line in advance or behind thereof with respect to a vertical reference phase when the effective video information is read from the field memory 356. By performing the scanning line conversion and aspect ratio conversion as mentioned above, a signal having the same format as the HD signal and having the same field frequency as the NTSC signal, i.e. a luminance signal Yh' of the pseudo HD signal having 1125 scanning lines, a field frequency of 59.94 Hz, an interlace ratio of 2:1 and an aspect ratio of 16:9, can be formed. A reproduced picture as shown in (c) of FIG. 12 having no distortion can be displayed on the screen of the HD display having an aspect ratio of 16:9 by recording and reproducing the luminance signal Yh' of the pseudo HD signal with the HD signal recording and/or reproducing apparatus 600 of FIG. 1, although the upper and lower ends of the picture are not displayed on the screen.

The scanning line conversion and the aspect ratio conversion are performed for the chrominance signals (R-Y)e and (B-Y)e of the ED signal inputted from the terminals 352 and 353, respectively, similarly to the luminance signal Ye and the luminance signal Yh' and the chrominance signals (R-Y)h' and (B-Y)h' of the pseudo HD signal are supplied to the terminals 377 to 379, respectively.

Now returning to FIG. 5, the luminance signal Yh' and chrominance signals (R-Y)h' and (B-Y)h' of the pseudo HD signal which are formed in the first and second signal conversion circuits 320 and 350 are supplied to the switching circuit 312. The switching circuit 312 is identical with the above mentioned switching circuit 311 and is responsive to the control signal CDM from the display mode presetting circuit 310 so that it supplies the luminance signal Yh' and the chrominance signals (R-Y)h' and (B-Y)h' of the pseudo HD signal formed in the first signal conversion circuit 320 to D/A converters 381 to 383, respectively, in the first display mode and supplies the luminance signal Yh' and the chrominance signals (R-Y)h' and (B-Y)h' of the pseudo HD signal which are formed in the second signal conversion circuit 350 to the D/A converters 381 to 383, respectively, in the second display mode. The D/A converters 381 to 383 convert the supplied digital pseudo HD signal into an analog HD signal and supply it to a matrix circuit 384 in response to the clock CK4.

The luminance signal Yh' and the chrominance signals (R-Y)h' and (B-Y)h' which have been converted into analog signals are converted into the luminance signal Y' and the chrominance signals PB' and PR' by the matrix circuit 384 and are supplied to terminals 385 to 387, respectively, as a signal having the same format as the HD signal and having the same field frequency as the NTSC signal, i.e. the pseudo HD signal having 1125 scanning lines, a field frequency of 59.94 Hz, an interlace ratio of 2:1 and an aspect ratio of 16:9.

Figure 16:
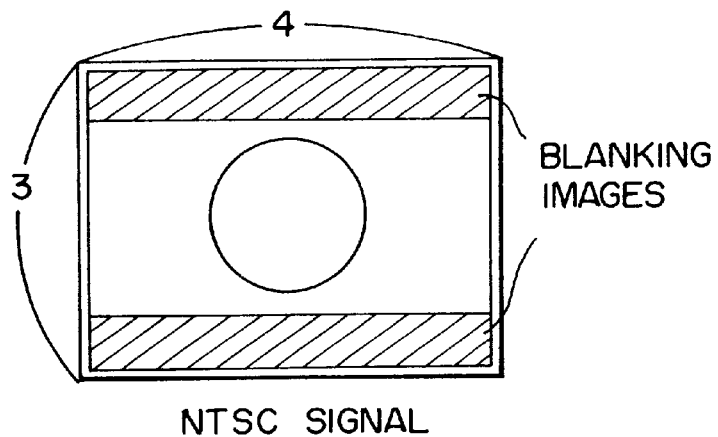
FIG. 16 is a diagram showing an image from an NTSC signal displayed on a screen with blanking images on the upper and lower portions of the screen.

In accordance with the first embodiment of the present invention, the display mode presetting circuit 310 enables the user to freely select one of the first and second display modes on recording the signal by depression of a push button. Accordingly, a reproduced picture which gives sensational reality in which a picture having no blanking images is effectively used can be obtained by elongating the video signal in a vertical direction by selecting the second display mode when the NTSC signal in which blanking images are inserted in the upper and lower portion of each field on the screen is recorded in the case of movie software as shown in FIG. 16. At this time, the user need not manually preset the display mode to the second display mode but the second display mode may be automatically preset by receiving from a television receiver an identification signal representative of the NTSC signal in which the blanking images are inserted in the upper and lower portions on the screen and controlling the display mode presetting circuit 310 in response to the identification signal.

Figure 13:
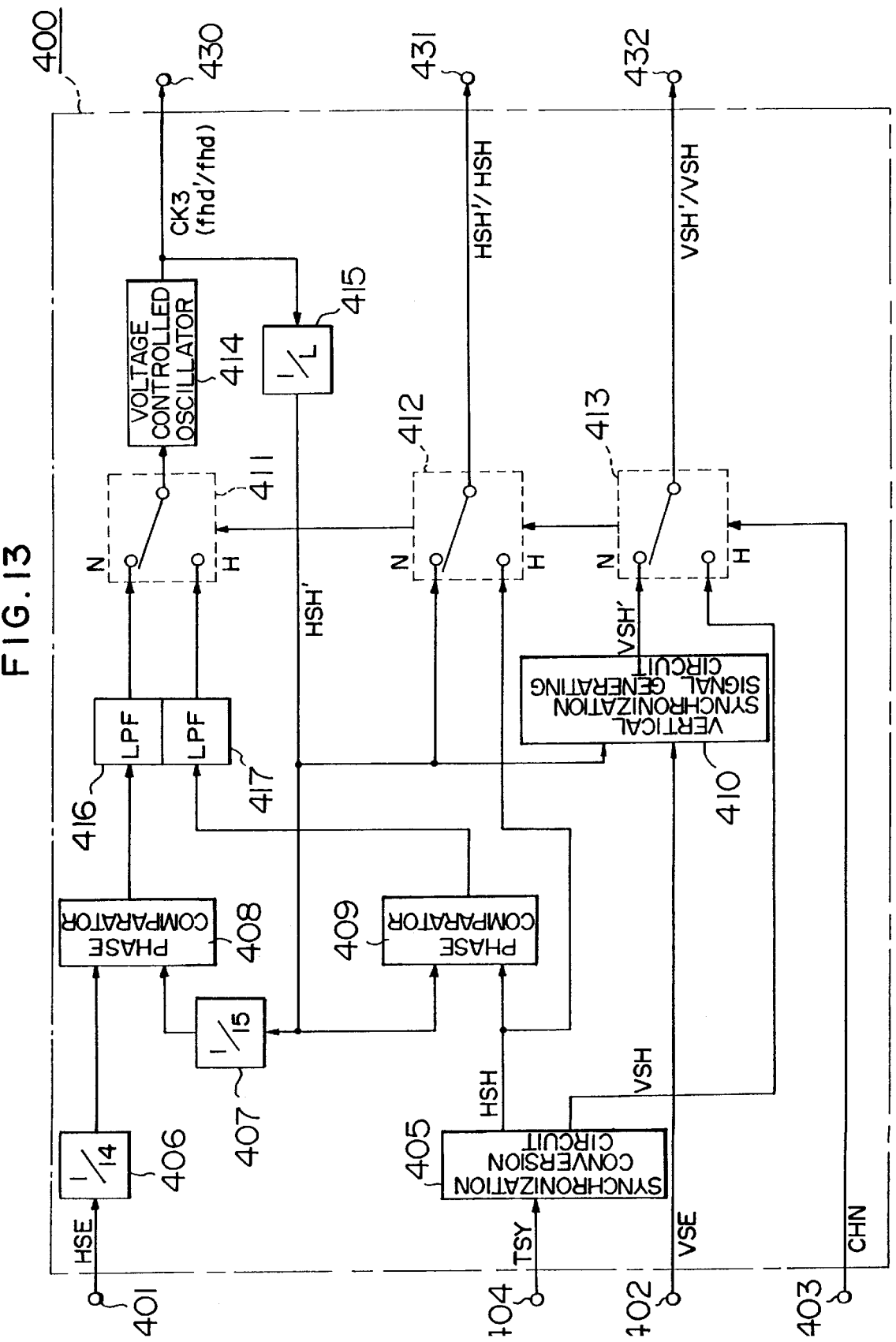
FIG. 13 is a block diagram showing an example of the timing signal generating circuit shown in FIG. 5.

A timing signal generating circuit 400 shown in FIG. 5 will be described. The timing signal generating circuit 400 generates the system clock CK3 (frequency=fhd'), the horizontal synchronization signal HSH' and the vertical synchronization signal VSH' of the pseudo HD signal which will be necessary for the recording signal processing circuit 520 so that the pseudo HD signal which is formed by converting the NTSC signal as mentioned above is recorded or reproduced by the HD signal recording and/or reproducing apparatus 600 as shown in FIG. 1. An example of the timing signal generating circuit 400 is shown in FIG. 13. The timing signal generating circuit 400 will be described in detail with reference to FIG. 13.

In FIG. 13, a reference numeral 401 denotes an input terminal for the horizontal synchronization signal HSE of the ED signal supplied from the interpolation and rate doubling processing circuit 200 of FIG. 1; 402 an input terminal for the vertical synchronization signal VSE of the ED signal supplied from the interpolation and rate doubling processing circuit 200 of FIG. 1; 403 an input terminal for the control signal CHN supplied from the recording mode presetting circuit 500; 404 an input terminal for the tri-state synchronization signal TSY of the HD signal supplied from the terminal 23 of FIG. 1; 405 a synchronization conversion circuit for converting the tri-state synchronization signal TSY into the horizontal synchronization signal HSH and the vertical synchronization signal VSH; 406 a 1/14 frequency dividing circuit; 407 a 1/15 frequency dividing circuit; 408 and 409 phase comparators; 410 a vertical synchronization signal generating circuit for generating the vertical synchronization signal VSH' of the pseudo HD signal; 411 to 413 switching circuits which are switched in response to the control signal CHN; 414 a voltage controlled oscillator for generating the system clock CK3; 415 a 1/L frequency dividing circuit (L is an integer); 416 and 417 low pass filters (hereinafter referred to as LPF); 430 an output terminal for the system clock CK3; 431 an output terminal for the horizontal synchronization signal HSH of the HD signal or the horizontal synchronization signal HSH' of the pseudo HD signal; and 432 an output terminal for the vertical synchronization signal VSH of the HD signal or the vertical synchronization signal VSH' of the pseudo HD signal.

A case in which the video signal to be recorded is the NTSC signal and a case in which the video signal is the HD signal will be separately described. Now, the case will be described in which the NTSC signal is converted into the pseudo HD signal, which is then recorded and/or reproduced by the HD signal recording and/or reproducing apparatus 600.

In this case, all the switching circuits 411 to 413 have output terminals connected with N side input terminals in response to the control signal CHN inputted from the terminal 403. As will be described hereafter, the system clock CK3 (frequency=fhd') is a sampling clock for converting the HD signal to a digital signal in the case where the pseudo HD signal is recorded and/or reproduced by the HD signal recording and/or reproducing apparatus 600 shown in FIG. 1. Accordingly, there is established a relation defined by equation (3) as follows:

$$fhh' = \frac{fhd'}{L} \quad (3)$$

wherein L denotes the number of samples in one line of the HD signal and fhh' (=33.716 kHz) denotes the horizontal scanning frequency of the pseudo HD signal.

Since the frame frequency of the NTSC signal is equal to that of the pseudo HD signal if the horizontal scanning frequency of the ED signal is represented by the (=31.468 kHz), there is established a relation defined by equation (4) as follows:

$$\frac{fhh'}{15} = \frac{fhe}{14} \quad (4)$$

Therefore, the system clock CK3 can be generated by a PLL circuit which will be described hereafter. In other words, the horizontal synchronization signal HSE of the ED signal inputted from the terminal 401 is supplied to the 1/14 frequency dividing circuit 406 by which the frequency of the signal HSE is divided by 14 and then the signal HSE is supplied to the phase comparator 408. On the other hand, the system clock CK3 having a frequency of fhd' outputted from the voltage controlled oscillator 414 is serially supplied to the 1/L frequency dividing circuit 415 and the 1/15 frequency dividing circuit 407, the frequency fhd' of the system clock CK3 is divided by L and 15 and the frequency divided clock is supplied to the phase comparator 408. The phase comparator 408 compares the phase of the signal having the frequency fhe/14 from the 1/14 frequency dividing circuit 406 with that of the signal having the frequency fhd'/(L·15) from the 1/15 frequency dividing circuit 407. An error signal from the phase comparator 408 is supplied to a control terminal of the voltage controlled oscillator 414 via the LPF 416 and the switching circuit 411 for controlling the oscillation frequency of the oscillator 414. The system clock CK3 having a given frequency fhd' can be generated and supplied to a terminal 430 by forming the PLL circuit so that equations (3) and (4) are satisfied in such a manner. Since it is apparent from equation (3) that the output of the 1/L frequency dividing circuit 415 has the same period as the horizontal scanning period τhh' (=1/fhh'=29.66 μs) of the pseudo HD signal, it is supplied to the terminal 431 via the switching circuit 412 as the horizontal synchronization signal HSH' of the pseudo HD signal is also supplied to the vertical synchronization signal generating circuit 410 for generating the vertical synchronization VSH' of the pseudo HD signal. The vertical synchronization signal generating circuit 410. The vertical synchronization signal generating circuit 410 generates the vertical synchronization signal VSH' of the pseudo HD signal having a period of 1/59.94 sec which is the same as that of the NTSC signal based upon the horizontal synchronization signal HSH' of the pseudo HD signal and the vertical synchronization signal VSE of the ED signal and supplies the signal VSH' to a terminal 432 via the switching circuit 413. Thus, the system clock CK3 (frequency=fhd'), the horizontal synchronization signal HSH' (period τhh'=1/fhh'=29.66 μs) of the pseudo HD signal and the vertical synchronization signal VSH' (period=1/59.94 sec) which will be necessary for the recording signal processing circuit 520 so that the pseudo HD signal formed by the conversion of the NTSC signal can be recorded and/or reproduced by the HD signal recording and/or reproducing apparatus 600 shown in FIG. 1 can be outputted.

Now, recording and/or reproducing of the HD signal in the HD signal recording and/or reproducing apparatus 600 shown in FIG. 1 will be described.

In this case, all the switching circuits 411 to 413 are connected with H side input terminals in response to the control signal CHN inputted from the terminal 403. When the HD signal is recorded and/or reproduced by the HD signal recording and/or reproducing apparatus 600 shown in FIG. 1, there is established a relation defined by the following equation (5) among the frequency fhd of the sampling clock CK3 for converting the HD signal into a digital signal, the number of samples (L) in one line of the HD signal and the horizontal scanning frequency fhh (=33.750 kHz) of the HD signal:

$$fhh = \frac{fhd}{L} \quad (5)$$

Accordingly, the system clock CK3 can be generated by the PLL circuit which will be described hereafter. The tri-state synchronization signal TSY of the HD signal inputted from the terminal 404 is converted into the horizontal and vertical synchronization signals HSH and VSH of the HD signal by the synchronization conversion circuit 405. The horizontal synchronization signal HSH of the HD signal outputted from the synchronization conversion circuit 405 is supplied to the phase comparator 409. On the other hand, the system clock CK3 having the frequency fhd outputted from the voltage controlled oscillator 414 is supplied to the 1/14 frequency dividing circuit 415 so that the frequency fhd of the clock CK3 is divide by L. The frequency-divided clock CK3 is supplied to the phase comparator 409. The phase comparator 409 compares the phase of the horizontal synchronization signal HSH having a frequency fhh (33.750 kHz) from the synchronization conversion circuit 405 with the signal having a frequency fhd/L from the 1/L frequency dividing circuit 415. An error signal from the phase comparator 409 is supplied to the voltage controlled oscillator 414 via the LPF 417 and the switching circuit 411 for controlling the oscillation frequency. The system clock CK3 having a given frequency fhd can be formed and supplied to the terminal 430 by forming the PLL circuit to satisfy equation (5) in such a manner. The horizontal synchronization signal HSH of the HD signal is supplied to a terminal 431 via the switching circuit 412. The vertical synchronization signal VSH of the HD signal from the synchronization conversion circuit 405 is supplied to a terminal 432 via the switching circuit 413. In such a manner, the system clock CK3 having a frequency fhd which will be necessary for the recording signal processing circuit 520 for recording and/or reproducing the HD signal by the HD signal recording and/or reproducing apparatus 600 shown if FIG. 1 and the horizontal synchronization signal HSH having a period τhh=1/fhh=29.63 μs and the vertical synchronization signal VSH having a period=1/60 sec of the HD signal can be outputted.

It is apparent from the foregoing that the system clock CK3 having a frequency of fhd'which satisfies equations (3) and (4) and the horizontal and vertical synchronization signals HSH' and VSH' of the pseudo HD signal can be generated and supplied to the terminals 430 to 432, respectively, when the pseudo HD signal which is formed by the conversion of the NTSC signal by the timing signal generating circuit 400 shown in FIG. 13 is recorded and/or reproducing apparatus 600 shown in FIG. 1. The system clock CK3 having a frequency fhd satisfying equation (5) can be generated and the clock CK3 and the horizontal and vertical synchronization signals HSH and VSH of the HD signal can be supplied to the terminals 430 to 432, respectively, when the HD signal is recorded and/or reproduced by the HD signal recording and/or reproducing apparatus 600 shown in FIG. 1.

In the present embodiment, the tri-state synchronization signal TSY of the HD signal is supplied from the terminal 23 in FIG. 1 independently of the luminance signal Y and the chrominance signals PB and PR of the HD signal. If the tri-state synchronization signal TSY is multiplexed with the luminance signal Y, the horizontal and vertical synchronization signals HSH and VSH of the HD signal may be obtained by separating the tri-state synchronization signal TSY from the luminance signal Y. In this case, it is not necessary to supply the tri-state synchronization signal TSY independently of the luminance signal Y and the chrominance signals PB and PR of the HD signal and the input terminal 23 of the tri-state synchronization signal TSY in RIG. 1 can be omitted.

Now, returning to FIG. 5 again, the system clock CK3, the horizontal synchronization signal HSH' (or HSH) and the vertical synchronization signal VSH' (or VSH) which are generated in the timing signal generating circuit 400 as mentioned above are supplied to the terminals 396 to 398, respectively. The system clock CK3 is also supplied to the PLL circuit 390. The PLL circuit 390 comprises a 1/n frequency dividing circuit 391 (n is an integer), a phase comparator 392, an LPF 393, a voltage controlled oscillator 394 and a 1/m frequency dividing circuit 395 (m is an integer) and generates the clock CK4 having a frequency f4. Now, the PLL circuit 390 will be described in detail.

The system clock CK3 (frequency=fhd') generated by the timing signal generating circuit 400 is supplied to a 1/n frequency dividing circuit 391 and is supplied to the phase comparator 392 after the frequency is divided by n. On the other hand, the frequency f4 of the clock CK4 outputted from the voltage controlled oscillator 394 is divided by m by the 1/m frequency dividing circuit 395 and the frequency divided clock CK4 is supplied to the phase comparator 392. The phase comparator 392 compares the phase of the signal having a frequency fhd'/n from the 1/n frequency dividing circuit 391 with that of the signal having a frequency f4/m from the 1/m frequency dividing circuit 395. An error signal from the phase comparator 392 is supplied to the control terminal of the voltage controlled oscillator 394 for controlling the oscillation frequency. Accordingly, the frequency f4 of the clock CK4 outputted from the voltage controlled oscillator 394 is represented by equation (6) as follows:

$$f4 = \frac{m}{n} \cdot fhd' = \frac{m}{n} \cdot (L \cdot fhh') \qquad (6)$$

On the other hand, for the first signal conversion circuit 320 it is necessary to preset the frequency f4 of the clock CK4 at an integer multiple of the horizontal scanning frequency fhh' of the pseudo HD signal, and about Te/(Th'·X) times as high as the frequency of the clock CK2 (=8 fsc) wherein Te denotes the effective video period in one line of the ED signal of 26.33 $\mu$s; Th' denotes the effective video period in one line of the pseudo HD signal of 24.83 $\mu$s; and X denotes a compression factor of 0.7. Therefore, the desired clock CK4 can be generated by the PLL circuit 390 by presetting m and n so that the following equation (7) is satisfied and m·L/n becomes an integer:

$$f4 = \frac{m \cdot L}{n} \cdot fhh' \approx \frac{Te}{Th' \cdot X} \cdot (8 fsc) \qquad (7)$$

In the second signal conversion circuit 350, it is necessary to preset the frequency f4 of the clock CK4 at an integer multiple of the horizontal scanning frequency fhh' of the pseudo HD signal and about Te/Th' times as high as the frequency of the clock CK2 which is 8 fsc. Therefore, a desired clock CK4 can be generated by the PLL circuit 390 by presetting n so that the following equation (8) is satisfied and (m·L/n) becomes an integer.

$$f4 = \frac{m \cdot L}{n} \cdot fhh' \approx \frac{Te}{Th'} \cdot (8 fsc) \qquad (8)$$

At this end, the desired clock CK4 can be supplied to the first or second signal conversion circuit 320 or 350 depending upon the display mode by presetting the frequency dividing ratios of the 1/n and 1/m frequency dividing circuits 391 and 395 so that equation (7) or (8) is satisfied in the first or second display mode (for performing the first or second signal conversion), respectively, in response to the control signal CDM outputted from the display mode presetting circuit 310.

Specifically, if the frequency of the system clock CK3 is preset at, for example, 44.550 MHz when the HD signal is recorded by the HD signal recording and/or reproducing apparatus 600 shown in FIG. 1, L would become 1320 in accordance with equation (5). Accordingly, the frequency fhd' of the system clock CK3 when the pseudo HD signal is recorded by the HD signal recording and/or reproducing apparatus 600 shown in FIG. 1 is 44.505 MHz in accordance with equation (3). At this time, it suffices to preset the frequency dividing ratios 1/n and 1/m of the 1/n and 1/m frequency dividing circuits 391 and 395 at 1/40 and 1/39, respectively, and the frequency f4 of the clock CK4 at 43.392 MHz when the scanning line conversion and aspect ratio conversion is performed in the first signal conversion circuit 320. It suffices to preset the frequency dividing ratios 1/n and 1/m of the 1/n and 1/m frequency dividing circuits 391 and 395 at 1/25 and 1/17, respectively, in accordance with equation (8) when the scanning line conversion and aspect ratio conversion is performed in the second signal conversion circuit and the frequency f4 of the clock CK4 will become 30.263 MHz.

In such a manner, the pseudo HD signal including the luminance signal Y' and the chrominance signals PB' and PR', the system clock CK3, the horizontal and vertical synchronization signals HSH' and VSH' of the pseudo HD signal can be generated in the high definition processing circuit 300 for one of the two display modes. The pseudo HD signal will become a video signal having a high picture quality by the conversion of the NTSC signal as mentioned above.

Referring now to FIG. 1 again, the pseudo HD signal generated by the high definition processing circuit 300 is supplied to the switching circuit 510. The switching circuit 510 selectively switches the HD signal inputted from the terminals 20 to 22 and the pseudo HD signal from the high definition processing circuit 300 in response to the control signal CHN from the recording mode presetting circuit 500 for selecting one of the HD signal recording mode and the NTSC signal recording mode. Accordingly, when the NTSC signal recording mode is selected, the recording signal processing circuit 520 is supplied with the pseudo HD signal through the switching circuit 510 and is also supplied with the system clock CK3 having the frequency fhd' (44.505 MHz in the embodiment) generated by the high definition processing circuit 300 and the horizontal and vertical synchronization signals HSH' and VSH' of the pseudo HD signal. The recording signal processing circuit 520 is adapted to convert the HD signal into the recording signal in a given format for recording the HD signal having 1125 scanning lines, a field frequency of 60.00 Hz and an interlace ratio of 2:1. The recording signal processing circuit 520 comprises, for example, an A/D converter, a memory and a D/A converter. The pseudo HD signal has a format having 1125 scanning lines, a field frequency of 59.94 Hz and an interlace ratio of 2:1 and is different from the HD signal in the field frequency. Even if the pseudo HD signal is supplied to the recording signal processing circuit 520, the pseudo HD signal can be converted into the recording signal having a given format by performing the signal processing totally identical with the case in which the HD signal is supplied in accordance with the system clock CK3 having the frequency fhd' (44.505 MHz in the embodiment) generated by the pseudo HD processing circuit 300 and the horizontal and vertical synchronization signals HSH' and VSH'. When a recording signal S' having a given format which has been converted in such a manner is to be recorded in an analog form, the signal S' is modulated by the FM modulating circuit 530 and thereafter supplied via the recording amplifier 535 to the magnetic heads 544 and 544' mounted on the rotary drum 542 so that it is recorded on the magnetic tape 540. At this time, the servo control circuit 570 controls the rotation of the magnetic heads 544 and 544' by rotary drum motor control and the running of the magnetic tape 540 by capstan motor control in accordance with a servo reference signal RSR' which is synchronized with the frame frequency (=29.97 Hz) or the field frequency (=59.94 Hz) of the pseudo HD signal and is generated by the recording signal processing circuit 520 in accordance with the system clock CK3 having the frequency fhd' (44.505 MHz) or the horizontal or vertical synchronization signal HSH' or VSH'.

The recording signal S' which has been recorded on the magnetic tape 540 is reproduced by the magnetic heads 544 and 544' and is supplied to the FM demodulating circuit 555 through the reproducing amplifier 550. The FM demodulating circuit 555 FM demodulates the reproduced recording signal S', which is then supplied to the reproduced signal processing circuit 560. The reproduced signal processing circuit 560 comprises, for example, an A/D converter, a memory, a D/A converter, etc., and converts the reproduced recording signal S' which has been recorded in a given format into the HD signal in synchronization with the reference clock CK5 having a stable frequency generated by the reference clock generating circuit 580. The frequency of the reference clock CK5 is preset at the same frequency (=fhd'=44.505 MHz in the embodiment) as that of the system clock CK3 in the case where the HD signal is recorded and/or reproduced by the HD signal recording and/or reproducing apparatus 600. At this time, the servo control circuit 570 performs the drum motor control and the capstan motor control in accordance with a servo reference signal PSR which is generated by the reproduced signal processing circuit 560 in response to the reference clock CK5 and is synchronized with the frame frequency (=30.00 Hz) or the field frequency (=60.00 Hz) of the HD signal. Even if the pseudo HD signal having 1125 scanning lines, a field frequency of 59.94 Hz and an interlace ratio of 2:1 which is formed by the conversion of the NTSC signal is recorded by the above mentioned operation, conversion of the field frequency or the frame frequency can be easily made by slightly changing the frequency of the servo reference signals (RSR' and PSR) for servo control in recording and reproducing modes, respectively, depending upon the field frequency (or the frame frequency) of the video signal to be recorded. A high definition reproduced video signal (luminance signal Y and chrominance signals PB and PR) which is converted from the NTSC signal into the format of the HD signal having 1125 scanning lines, a field frequency of 60.00 Hz and an interlace ratio of 2:1 is outputted from the reproduced signal processing circuit 560. The reference tri-state synchronization signal RTSY of the HD signal is generated in accordance with the reference clock CK5 in the synchronization information generating circuit 590. The reproduced signal including the luminance signal Y and the chrominance signals PB and PR and the reference tri-state synchronization signal RTSY are supplied to the terminals 30 to 33, respectively, and is displayed on an HD display 1000 having an aspect ratio of 16:9 depending upon the display mode preset on recording without any distortion as shown in (c) of FIG. 4 or (c) of FIG. 12.

Although the reference tri-state synchronization signal RTSY is supplied to the terminal 33 independently of the reproduced video signal (luminance signal Y and chrominance signals PB and PR) in the present embodiment, the reference tri-state synchronization signal RTSY may be added to the luminance signal Y of the reproduced video signal by an adder and the like. In this case, the output terminal 33 of the reference tri-state synchronization signal RTSY may be omitted.

If the pseudo HD signal generated by the high definition processing circuit 300 is outputted externally from the apparatus and is displayed by the HD display 1000 shown in FIG. 1, the pseudo HD signal having a high picture quality can be monitored even when the inputted video signal is the NTSC signal.

It is apparent from the foregoing that the video signal to be recorded can be recorded and reproduced by the HD recording and/or reproducing apparatus 600 by converting the NTSC signal into the pseudo HD signal even when the video signal is the NTSC signal. As a result of this, the NTSC signal is converted into the video signal having a high picture quality in the form of the HD signal so that it can be reproduced without distortion.

Although recording of the NTSC signal has been described, recording of the HD signal will be described with reference to FIG. 1.

If the HD signal is recorded, the switching circuit 510 selects the HD signal including the luminance signal Y and the chrominance signals PB and PR supplied from the terminals 20 to 22 in response to the control signal from the recording mode presetting circuit 500 and supplies it to the recording signal processing circuit 520. The system clock CK3 having the frequency fhd (44.550 MHz in the embodiment) and the horizontal and vertical synchronization signals HSH and VSH of the HD signal which are outputted from the high definition circuit 300 are also supplied to the recording signal processing circuit 520. The recording signal processing circuit 520 converts the HD signal into a recording signal S having the same format as the case in which the pseudo HD signal is recorded in accordance with the system clock CK3 and the horizontal and vertical synchronization signal HSH and VSH of the HD signal. After the thus converted recording signal S in a given format is FM modulated by the FM demodulating circuit 530, it is supplied to the magnetic heads 544 and 544' mounted on the rotary drum 542 via the recording amplifier 535 so that it is recorded on the magnetic tape 540. At this time, the servo control circuit 570 performs the rotary drum control and the capstan motor control in response to the servo reference signal RSR which is generated by the recording signal processing circuit 520 in accordance with the system clock CK3 having the frequency fhd (44.550 MHz in the embodiment) or the horizontal synchronization signal HSH and the vertical synchronization signal VSH and is synchronized with the frame frequency (=30.00 Hz) or the field frequency (=60.00 Hz) of the HD signal.

The recording signal S which has been recorded on the magnetic tape 540 as mentioned above is reproduced by the magnetic heads 544 and 544', the reproducing amplifier 550, the FM demodulating circuit 555 and the reproduced signal processing circuit 560 totally similarly to the case in which the pseudo HD signal is reproduced. The rotary drum motor control and the capstan motor control is performed by the servo control circuit 570 in accordance with the servo reference signal PSR totally similarly to the case in which the pseudo HD signal is reproduced. This causes the luminance signal Y and the chrominance signals PB and PR of the HD signal to be reproduced and supplied to the terminals 30 to 32, respectively. At this time, the reference tri-state synchronization signal RTSY may be added to the luminance signal Y of the reproduced HD signal by an adder, etc. In this case, the output terminal 33 of the reference tri-state synchronization signal RTSY may be omitted.

Therefore, two video signals such as NTSC and HD signals which are in different formats can be recorded and/or reproduced by one VTR for compatibility with each other in accordance with the present invention. Since the NTSC signal is recorded and/or reproduced as a high quality video signal in the format of the HD signal, a reproduced picture having a better quality than that of the NTSC signal can be provided to the users even if the video signal to be recorded is the NTSC signal. In the case where the NTSC signal is converted into the pseudo HD signal for recording and/or reproducing, the users can select one of the first and second display modes for making the operation easier.

In the present invention, the HD signal recording and/or reproducing apparatus 600 for recording and/or reproducing the HD signal may be any type recording and/or reproducing apparatus if it is capable of recording and/or reproducing the HD signal. The apparatus 600 may be, for example, a digital VTR for digitally recording the HD signal.

In FIG. 1, a signal inverse conversion circuit for inversely converting the reproduced signal into the NTSC signal may be provided at the output of the HD signal recording and/or reproducing apparatus 600 so that the reproduced HD signal is inversely converted into the NTSC signal and the inversely converted NTSC signal may be outputted externally from the apparatus. Alternatively, a selecting circuit for selecting one of the reproduced HD signal and the inversely converted NTSC signal and an output mode presetting circuit for controlling the selecting circuit may be provided so that the user can freely select one of a first output mode in which the reproduced HD signal is selected and outputted and a second output mode in which the NTSC signal is selected and outputted by controlling the selecting circuit in response to a control signal from the output mode presetting circuit. This enables the reproduced video signal to be displayed on the NTSC display having an aspect ratio of 4:3.

Although the first signal conversion circuit 320 (shown in FIG. 6) is provided independently of the second signal conversion circuit 350 (shown in FIG. 9) in the high definition processing circuit 300 shown in FIG. 5, common field memories may be used for the field memories 330 to 332 of FIG. 6 and the field memories 356 to 358 of FIG. 9.

Figure 14:
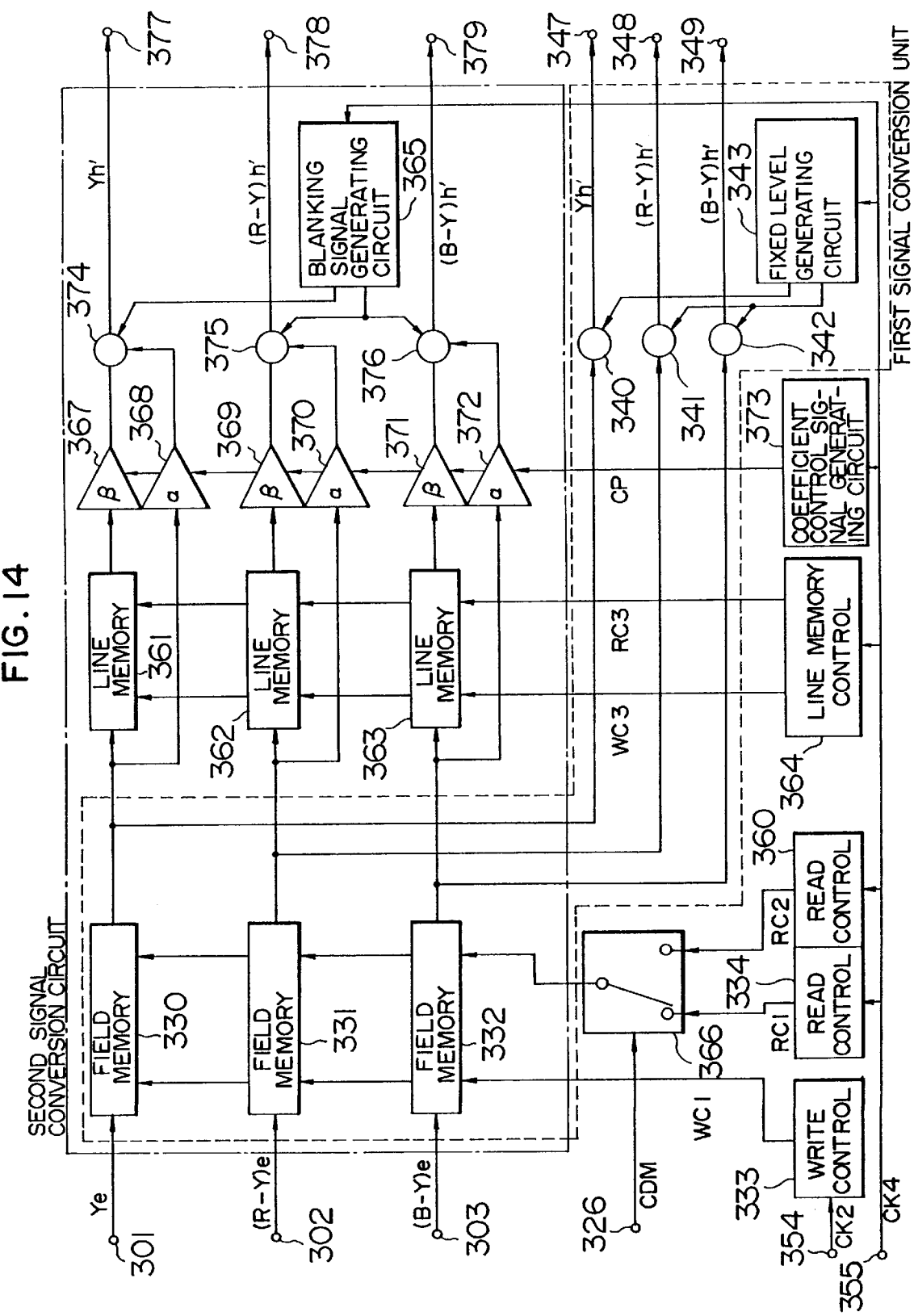
FIG. 14 is a block diagram showing another example of the first and second signal conversion circuits.

Referring now to FIG. 14, there is shown a block diagram showing another example of the first and second signal conversion circuits. In FIG. 14, a reference numeral 326 denotes an input terminal for the control signal CDM outputted from the display mode presetting circuit 310 of FIG. 5; and 366 a switching circuit for selectively switching the read control signal RC1 from the read control circuit 334 and the read control signal RC2 from the read control circuit 360 in response to the control signal CDM. The other components of FIG. 14 are common to those of FIGS. 5, 6 and 9. Common components are represented by like reference numerals. Description of the common parts is omitted herein. Common use of the field memories can be easily realized by merely selecting and supplying to the field memories 330 to 332 the read control signal RC1 or RC2 from the read control circuit 334 or 360 in the first or second display mode, respectively, in response to the control signal CDM inputted from the terminal 326 in the switching circuit 366.

Figure 17A:
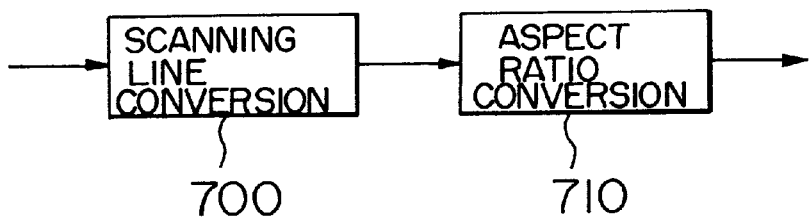
FIGS. 17A and 17B are block diagrams showing alternative structures of the first and second signal conversion circuits.
Figure 17B:
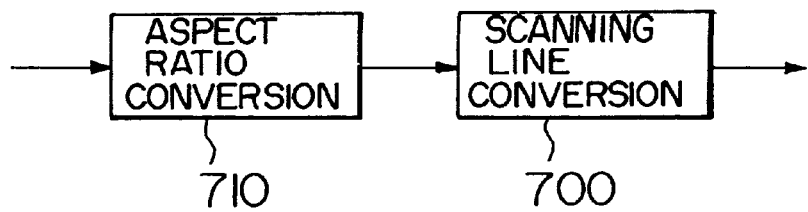

The first and second signal conversion circuits 320 (FIG. 6) and 350 (FIG. 9) are formed to simultaneously perform the scanning line conversion and the aspect ratio conversion. However, as shown in FIGS. 17A and 17B, a scanning line conversion circuit 700 for performing the scanning line conversion and an aspect ratio conversion circuit 710 for performing the aspect ratio conversion may be separately provided and be cascade-connected with each other.

Figure 15:
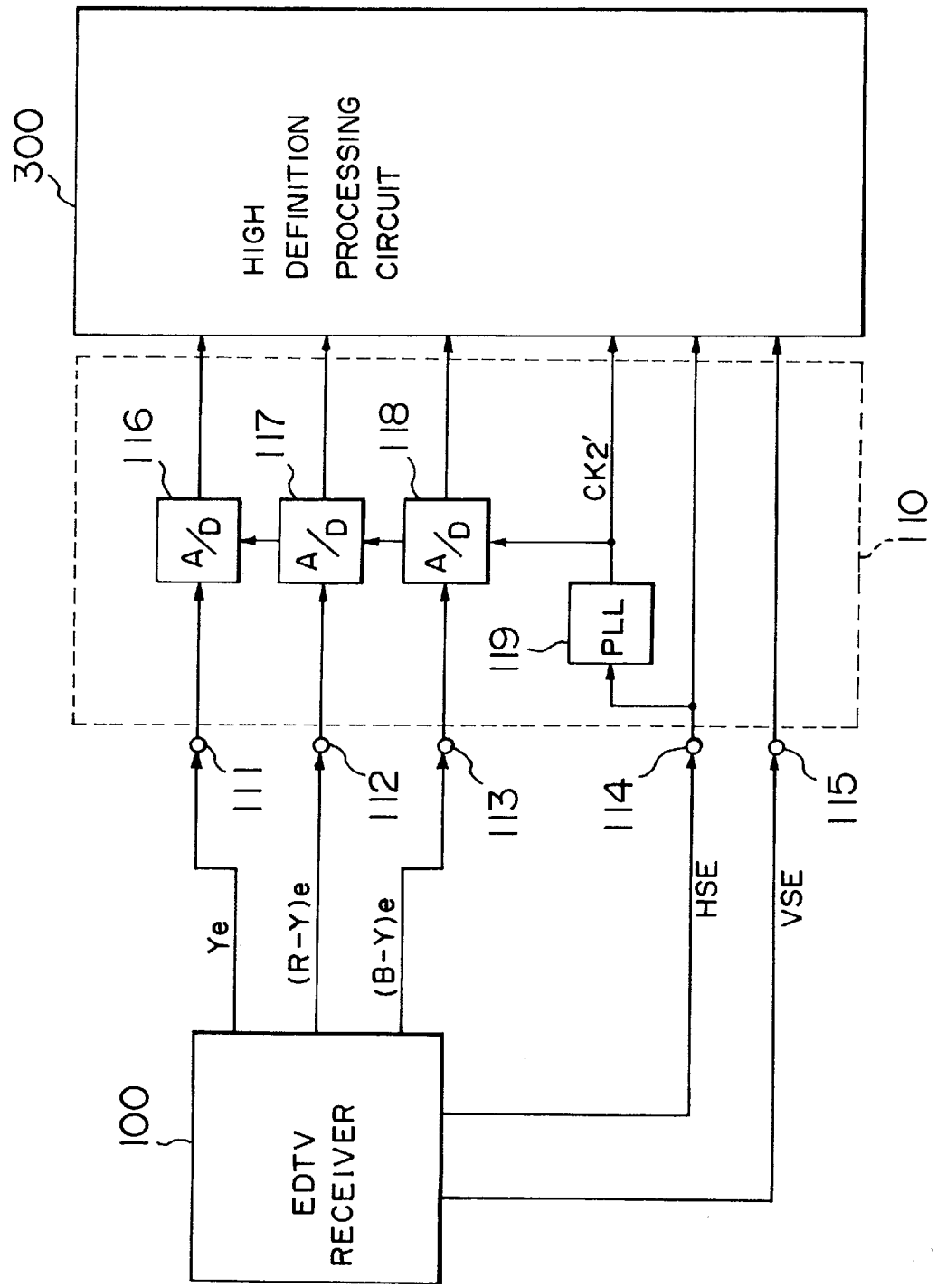
FIG. 15 is a block diagram showing a second embodiment of the video signal recording and/or reproducing apparatus of the present invention.

Although the embodiment of FIG. 1 is formed so that the NTSC signal is converted into the ED signal by the interpolation and rate doubling processing circuit 200 in the apparatus of the present invention and is transformed into the pseudo HD signal by the high definition processing circuit 300, the luminance signal Ye and the chrominance signals (R-Y)e and (B-Y)e and the horizontal synchronization signal HSE and the vertical synchronization signal VSE may be received from an external television receiver such as an EDTV receiver having the same function as the interpolation and rate doubling processing circuit 200. A second embodiment of the present invention in which the ED signal (the luminance signal Ye and the chrominance signals (R-Y)e and (B-Y)e) and the horizontal and vertical synchronization signals HSE and VSE are received from an external EDTV receiver is shown in FIG. 15. In FIG. 15, a reference numeral 100 denotes an external EDTV receiver; 110 a sampling circuit; 111 to 113 input terminals for the luminance signal Ye and the chrominance signals (R-Y)e and (B-Y)e of the ED signal, respectively; 114 an input terminal for the horizontal synchronization signal HSE of the ED signal; 115 an input terminal for the vertical synchronization signal VSE of the ED signal; 116 to 118 A/D converters; 119 a PLL circuit and 300 the high definition processing circuit shown in FIG. 1.

In the case where the ED signal (the luminance signal Ye and the chrominance signals (R-Y)e and (B-Y)e) and the horizontal and vertical synchronization signals HSE and VSE are received from the external EDTV receiver 100, the sampling circuit 110 is provided at the input stage of the high definition processing circuit 300 in lieu of the interpolation and rate doubling processing circuit 200 shown in FIG. 1. The luminance signal Ye and the chrominance signals (R-Y)e and (B-Y)e of the ED signal and the horizontal and vertical synchronization signals HSE and VSE are supplied to the sampling circuit 110 via the terminals 111 to 115. The horizontal synchronization signal HSE inputted from the terminal 114 is supplied to the PLL circuit 119. The PLL circuit 119 comprises a phase comparator, a voltage controlled oscillator, etc., and generates a clock CK2' having a frequency of 8 fsc which is synchronized in phase with the horizontal synchronization signal HSE and supplies the clock CK2' to the A/D converters 116 to 118. The luminance signal Ye and the chrominance signals (R-Y)e and (B-Y)e which are inputted from the terminals 111 to 113 are supplied to the A/D converters 116 to 118, respectively, and they are serially converted into digital form from analog form in synchronization with the clock CK2'. The pseudo HD signal can be formed similarly to the embodiment of FIG. 1 by supplying the luminance signal Ye and the chrominance signals (R-Y)e and (B-Y)e of the ED signal which have been converted into digital signals in such a manner and the clock CK2' in lieu of the clock CK2 of FIG. 2.

In the second embodiment of the present invention shown in FIG. 15, the ED signal having an aspect ratio of 4:3 (the luminance signal Ye and the chrominance signals (R-Y)e and (B-Y)e) and the horizontal and vertical synchronization signals HSE and VSE are directly received from the external EDTV receiver 100. If a composite synchronization signal CSE in which the horizontal and vertical synchronization signals HSE and VSE are in composite form is added to the luminance signal Ye, only the ED signal (the luminance signal Ye and the chrominance signals (R-Y)e and (B-Y)e) may be received from the external EDTV receiver 100 and a synchronization information separation circuit 250 shown in FIG. 2 may be provided in the sampling circuit 110 for separating the horizontal and vertical synchronization signals HSE and VSE from the luminance signal Ye.

Figure 18:
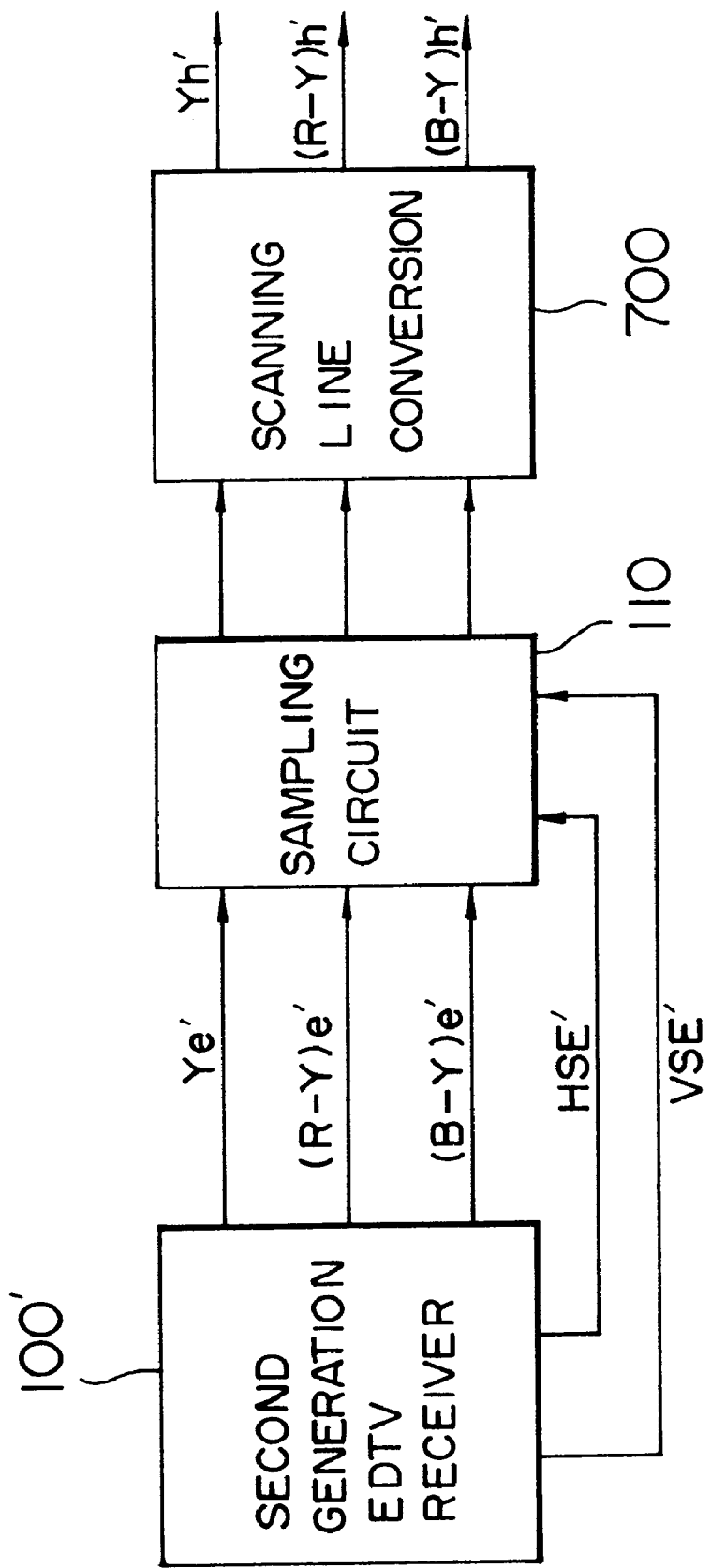
FIG. 18 is a block diagram showing a third embodiment of the video signal recording and/or reproducing apparatus.

A second generation EDTV is under consideration. The second generation EDTV aims at providing a wide aspect ratio and high quality picture while maintaining compatibility with the current NTSC system. It is expected that the aspect ratio will be 16:9. Accordingly, similarly to the foregoing, the second generation ED signal having an aspect ratio of 16:9 (the luminance signal Ye' and the chrominance signals (R-Y)e' and (B-Y)e') and the horizontal and vertical synchronization signals HSE' and VSE' are received from an external second generation EDTV receiver to form the pseudo HD signal. A third embodiment of the present invention in this case is shown in FIG. 18. In FIG. 18, a reference numeral 100' denotes a second generation EDTV receiver; 110 denotes a sampling circuit shown in FIG. 15; and 700 a scanning line conversion circuit for scanning line conversion shown in FIGS. 17A and 17B. Since the second generation ED signal has an aspect ratio of 16:9 which is the same as that of the HD signal, it is not necessary to perform the aspect ratio conversion for converting the ED signal into the pseudo HD signal and the pseudo HD signal can be formed by merely performing scanning line conversion. After the second generation ED signal which is supplied from the second generation EDTV receiver 100' is converted into digital form from analog form by the sampling circuit 110 as shown in FIG. 15 in the same manner as in the embodiment of FIG. 15, the pseudo HD signal (the luminance signal Yh' and the chrominance signals (R-Y)h' and (B-Y)h') can be formed by performing the scanning line conversion of the second generation ED signal by the scanning line conversion circuit 700 shown in FIG. 18 to provide 1125 scanning lines, a field frequency of 59.94 Hz and an interlace ratio of 2:1.

If a composite synchronization signal CSE' in which the horizontal and vertical synchronization signals HSE' and VSE' are in composite form is added to the luminance signal Ye', only the ED signal (the luminance signal Ye' and the chrominance signals (R-Y)e' and (B-Y)e') may be received from an external second generation EDTV receiver and the synchronization information separation circuit 250 shown in FIG. 2 may be provided in the sampling circuit 110 for separating the horizontal and vertical synchronization signals HSE' and VSE' from the luminance signal Ye'.

If an external television receiver has the same capability as that of the interpolation and rate doubling processing circuit 200 and the high definition processing circuit 300 shown in FIG. 1 for converting the NTSC signal into the pseudo HD signal to output the pseudo HD signal, the pseudo HD signal may be received from the external television receiver and be supplied to the switching circuit 510 of FIG. 1. The mode in which the pseudo HD signal is recorded, i.e. in which the NTSC signal is recorded, may be automatically preset by supplying to the recording mode presetting circuit 500, together with the pseudo HD signal, an identification signal representing that the pseudo HD signal is inputted for controlling the recording mode presetting circuit 500 in response thereto.

Furthermore, by including the interpolation and rate doubling processing circuit 200 and the high definition processing circuit 300 of the present invention as shown in FIG. 1 in a standard television receiver, such as an NTSC receiver, it is possible to provide a television receiver which is capable of displaying a pseudo HD signal having an improved picture quality as well as an NTSC signal. In this case, a display mode selection circuit for selecting an NTSC display mode or a pseudo HD display mode is provided, and the video signal to be displayed (the NTSC signal or the pseudo HD signal) is selected in accordance with an output of the display mode selection circuit.

Furthermore, by including the high definition processing circuit 300 of the present invention as shown in FIG. 1 in a television receiver providing the same function as the interpolation and rate doubling processing circuit 200 of the present invention as shown in FIG. 1, such as an EDTV receiver, it is possible to provide a television receiver which is capable of displaying a pseudo HD signal having an improved picture quality as well as an ED signal and an NTSC signal. In this case, a display mode selection circuit for selecting an NTSC display mode, an ED display mode, or a pseudo HD display mode is provided, and the video signal to be displayed (the NTSC signal, the ED signal, or the pseudo HD signal) is selected in accordance with an output of the display mode selection circuit.

Furthermore, by including the scanning line conversion circuit 700 of the present invention as shown in FIGS. 17A, 17B, and 18 in the second generation EDTV receiver 100' shown in FIG. 18, it is possible to provide a television receiver which is capable of displaying a pseudo HD signal having an improved picture quality as well as a second generation ED signal, an ED signal, and an NTSC signal. In this case, a display mode selection circuit for selecting an NTSC display mode, an ED display mode, a second generation ED display mode, or a pseudo HD display mode is provided, and the video signal to be displayed (the NTSC signal, the ED signal, the second generation ED signal, or the pseudo HD signal) is selected in accordance with an output of the display mode selection circuit.

Having described recording and reproducing of the video signal, recording and reproducing of the audio signal in each system will be described.

1. Audio recording system of the HD signal recording and/or reproducing apparatus 600 is a PCM digital recording system.

1) Audio recording for recording and/or reproducing the HD signal.

In an audio signal processing circuit, the audio signal is sampled in accordance with a system clock having a frequency fs and is PCM modulated for recording and/or reproducing. At this time, the servo control circuit 570 shown in FIG. 1 operates for recording and reproducing in the same manner as in the case in which the video signal is recorded and reproduced. The servo control circuit 570 performs the rotary drum motor control and the capstan motor control in accordance with the servo reference signals RSR and PSR synchronized with the frame frequency (30.00 Hz) or the field frequency (60.00 Hz) of the HD signal.

2) Audio recording in the case in which the NTSC signal is converted into the pseudo HD signal for recording and/or reproducing.

During recording, the audio signal is sampled in accordance with the system clock having the frequency fs which is decreased by the ratio of the field frequency of the NTSC signal to that of the HD signal:

$$(1000/1001) \times fs$$

wherein 1000/1001=59.94/60.00 and is PCM modulated for recording. At this time, the servo control circuit 570 shown in FIG. 1 performs the rotary drum motor control and the capstan motor control in accordance with the servo reference signal RSR' synchronized with the frame frequency (29.97 Hz) or the field frequency (59.94 Hz) of the pseudo HD signal (NTSC signal) in the same manner as in the recording of the pseudo HD signal. This enables the audio signal to be recorded in the same format as the audio recording format in the case where the HD signal is recorded.

During reproducing of the audio signal, the audio signal can be reproduced by making normal the frequency of the system clock of the audio signal processing circuit. At this time, the servo control circuit 570 performs the rotary drum motor control and the capstan motor control in accordance with the servo reference signal PSR synchronized with the frame frequency (30.00 Hz) or the field frequency (60.00 Hz) of the HD signal.

2. The audio recording system of the HD signal recording and/or reproducing apparatus 600 is an analog recording system.

The audio recording in which the NTSC signal is converted into the pseudo HD signal for recording and/or reproducing is similar to the recording of the pseudo HD signal. During recording, the servo control circuit 570 shown in FIG. 1 performs the rotary drum motor control and the capstan motor control in accordance with the servo reference signal RSR' synchronized with the frame frequency (29.97 Hz) or the field frequency (59.94 Hz) of the pseudo HD signal (NTSC signal). During reproducing of the audio signal, the servo control circuit 570 performs the rotary drum motor control and the capstan motor control in accordance with the servo reference signal PSR synchronized with the frame frequency (30.00 Hz) or the field frequency (60.00 Hz) of the HD signal for reproducing the audio signal without changing the audio signal processing circuit.

In accordance with the present invention, video signals of two systems such as NTSC and HD signals can be recorded and/or reproduced by a single apparatus. The NTSC signal is reproduced as a video signal having a high quality in the form of the HD signal. Even if the video signal to be recorded is the NTSC signal, a reproduced picture without any distortion having a better picture quality than that of the NTSC signal can be provided to users. When the NTSC signal is recorded, the users can freely select one of two display modes by depressing a push button, etc. Similarly, a video signal of the ED signal (aspect ratios 4:3 and 16:9) can be recorded and/or reproduced by a single apparatus.

What is claimed is:

1. A video signal recording and/or reproducing apparatus for recording and/or reproducing a standard television signal and a high definition television signal having a broader band than that of the standard television signal, comprising:

recording mode presetting means for presetting one of a first recording mode in which said high definition television signal is recorded and a second recording mode in which said standard television signal is recorded;

interpolation and rate doubling processing means for applying scanning line interpolation and rate doubling conversion processing for the standard television signal to output a double rate signal;

high definition processing means for applying to the double rate signal outputted from said interpolation and rate doubling processing means a scanning line conversion processing to convert the double rate signal into a signal having a same format as that of the high definition television signal and a same field frequency as that of the standard television signal and an aspect ratio conversion processing to convert the double rate signal into a signal having a same aspect ratio as that of the high definition television signal;

a high definition television signal recording and/or reproducing means for recording and/or reproducing a high definition signal in accordance with a given format; and servo control means for performing servo control in given recording and reproducing modes on recording and reproducing, respectively in response to an output from said recording mode presetting means;

one of said first and second recording modes being selected in response to an output from said recording mode presetting means so that the high definition television signal is recorded and/or reproduced by said recording and/or reproducing means when the first recording mode is selected and an output signal from said high definition processing means is recorded and/or reproduced by said recording and/or reproducing means when said second recording mode is selected.

2. A video signal recording and/or reproducing apparatus according to claim 1 in which said high definition processing means comprises a first signal conversion means for performing the scanning line conversion processing and the aspect ratio conversion processing by time-axis compressing said double rate signal.

3. A video signal recording and/or reproducing apparatus according to claim 1 in which said high definition processing means comprises a second signal conversion means for performing the scanning line conversion processing and the aspect ratio conversion processing by interpolating scanning lines and time-axis compressing said double rate signal.

4. A video signal recording and/or reproducing apparatus according to claim 1 in which said high definition processing means comprises:

first signal conversion means;

second signal conversion means; and mode presetting means for selecting one of a first mode for applying the scanning line conversion processing and the aspect ratio conversion processing to said double rate signal by said first signal conversion means and a second mode for applying the scanning line conversion processing and the aspect ratio conversion processing to said double rate signal by said second signal conversion means;

one of said first mode and said second mode being selected in response to an output from said mode presetting means.

5. A video signal recording and/or reproducing apparatus according to claim 4 in which when the standard television signal is a standard television signal including blanking images to be displayed in upper and lower portions of a screen, said mode presetting means is automatically preset to said second mode in response to an identification signal representing that said standard television signal is said standard television signal including said blanking images, said identification signal being supplied from identification signal generating means in a television receiver.

6. A video signal recording and/or reproducing apparatus according to claim 4 in which each of said first signal conversion means and said second signal conversion means comprises:

scanning line converting means for performing a scanning line conversion process to convert an inputted signal into a signal having a same signal format as the high definition television signal and a same field frequency as that of the standard television signal; and aspect ratio converting means for performing the aspect ratio conversion processing to convert the aspect ratio of the inputted signal into a same aspect ratio as that of the high definition television signal;

said aspect ratio converting means being cascade-connected with a post stage of the scanning line converting means.

7. A video signal recording and/or reproducing apparatus according to claim 4 in which each of said first signal conversion means and said second signal conversion means comprises:

scanning line converting means for performing a scanning line conversion process to convert an inputted signal into a signal having a same signal format as the high definition television signal and a same field frequency as that of the standard television signal; and aspect ratio converting means for performing the aspect ratio conversion processing to convert the aspect ratio of the inputted signal into a same aspect ratio as that of the high definition television signal;

said scanning line converting means being cascade-connected with a post stage of said aspect ratio converting means.

8. A video signal recording and/or reproducing apparatus according to claim 7 in which a signal from a television receiver including said interpolation and rate doubling processing means and said aspect ratio converting means is processed by said scanning line converting means and is recorded and/or reproduced by said recording and/or reproducing means.

9. A video signal recording and/or reproducing apparatus according to claim 1 in which the signal from said high definition processing means is displayed on a display which is externally provided.

10. A video signal recording and/or reproducing apparatus according to claim 1 further including signal inversely converting means for inversely converting the reproduced high definition television signal outputted from said recording and/or reproducing means into the standard television signal, the standard television signal from said signal inversely converting means and the reproduced high definition television signal outputted from said recording and/or reproducing means being outputted externally of the apparatus.

11. A video signal recording and/or reproducing apparatus, according to claim 10 further including output mode presetting means for presetting one of a first output mode in which the reproduced high definition television signal outputted from said recording and/or reproducing means is outputted externally of the apparatus and a second output mode in which the standard television signal outputted from said signal inversely converting means is outputted externally of the apparatus; and selectively outputting means for outputting said reproduced high definition television signal and said inversely converted standard television signal externally of the apparatus when the first and second output modes are selected, respectively;

one of said first and second output modes being selected in response to the output from said output mode presetting means.

12. A video signal recording and/or reproducing apparatus according to claim 1 in which the double rate signal from said interpolation and rate doubling processing means is supplied from a television receiver including said interpolation and rate doubling processing means.

13. A video signal recording and/or reproducing apparatus according to claim 1 in which the double rate signal from said high definition processing means is supplied from a television receiver including said interpolation and rate doubling processing means and said high definition processing means.

14. A video signal recording and/or reproducing apparatus according to claim 13 in which said recording mode presetting means is automatically preset to said second recording mode in response to an identification signal from a television receiver including said interpolation and rate doubling means and said high definition processing means, said identification signal representing that said double rate signal is being supplied from said television receiver.

15. A video signal recording and/or reproducing apparatus according to claim 7 in which a signal from said aspect ratio converting means is supplied from a television receiver including said interpolation and rate doubling processing means and said aspect ratio converting means which is capable of outputting the double rate signal having a same aspect ratio as that of the high definition television signal.

16. A video signal recording and/or reproducing apparatus according to claim 1 in which said high definition television signal includes an HD (high definition) signal and said standard television signal includes an NTSC signal and an ED (extended definition) signal.

17. In a television receiver including a standard television receiver, the improvement comprising:

interpolation and rate doubling processing means for applying a scanning line interpolation and rate doubling conversion processing to a standard television signal to output a double rate signal;

high definition processing means for applying to the double rate signal outputted from said interpolation and rate doubling processing means a scanning line conversion processing to convert the double rate signal into a signal having a same signal format as that of a high definition television signal and a same field frequency as that of the standard television signal and for applying an aspect ratio conversion processing to convert the double rate signal into a signal having a same aspect ratio as that of the high definition television signal;

a display capable of displaying an output signal of said high definition processing means;

display mode setting means for setting a first display mode or a second display mode, wherein a standard television signal outputted from said standard television receiver is displayed on the display in said first display mode, and the output signal of said high definition processing means is displayed on the display in said second display mode; and selective display means for displaying the standard television signal on the display when said first display mode is selected and for displaying the output signal of said high definition processing means on the display when said second display mode is selected;

said selective display means being controlled by an output of said display mode setting means to select said first display mode or said second display mode.

18. In a television receiver including interpolation and rate doubling processing means for applying a scanning line interpolation and rate doubling conversion processing to a standard television signal to output a double rate signal, the improvement comprising:

high definition processing means for applying to the double rate signal outputted from said interpolation and rate doubling processing means a scanning line conversion processing to convert the double rate signal into a signal having a same signal format as that of a high definition television signal and a same field frequency as that of the standard television signal and for applying an aspect ratio conversion processing to convert the double rate signal into a signal having a same aspect ratio as that of the high definition television signal;

a display capable of displaying an output signal of said high definition processing means;

display mode setting means for setting a first display mode or a second display mode, wherein an output signal of the television receiver including said interpolation and rate doubling processing means is displayed on the display in said first display mode and the output signal of said high definition processing means is displayed on the display in said second display mode; and selective display means for displaying the output signal of the television receiver including said interpolation and rate doubling processing means on the display when said first display mode is selected and for displaying the output signal of said high definition processing means on the display when said second display mode is selected;

said selective display means being controlled by an output of said display mode setting means to select said first display mode or said second display mode.

19. In a television receiver including:

interpolation and rate doubling processing means for applying a scanning line interpolation and rate doubling conversion processing to a standard television signal to output a double rate signal; and aspect ratio conversion means for converting the double rate signal outputted from said interpolation and rate doubling processing means into a signal having a same aspect ratio as that of a high definition television signal, thereby to output a signal which is a double rate signal and which has the aspect ratio the same as that of the high definition television signal;

the improvement comprising:

scanning line conversion means for converting the signal outputted from the television receiver including said interpolation and rate doubling processing means and said aspect ratio conversion means into a signal having a same signal format as that of the high definition television signal and a same field frequency as that of a standard television signal;

a display capable of displaying an output signal of said scanning line conversion means;

mode setting means for setting a first display mode or a second display mode, wherein the signal outputted from the television receiver including said interpolation and rate doubling processing means and said aspect ratio conversion means is displayed on the display in said first display mode and the output signal of said scanning line conversion means is displayed on the display in said second display mode; and selective display means for displaying the signal outputted from the television receiver including said interpolation and rate doubling processing means and said aspect ratio conversion means when said first display mode is selected, and for displaying the output signal of said scanning line conversion means when said second display mode is selected;

said selective display means being controlled by an output from said display mode setting means to select said first display mode or said second display mode.

* * * * *